(12) United States Patent
Fiala et al.

(10) Patent No.: US 8,732,059 B2
(45) Date of Patent: May 20, 2014

(54) METHOD AND SYSTEM FOR BUILDING AN INVESTMENT PORTFOLIO

(75) Inventors: William Elliott Fiala, Creve Coeur, MO (US); Scott David Harris, Carlinville, IL (US); Matthew James Mikula, St. Louis, MO (US)

(73) Assignee: Edward D. Jones & Co., L.P., St. Louis, MO (US)

( * ) Notice: Subject to any disclaimer, the term of this patent is extended or adjusted under 35 U.S.C. 154(b) by 290 days.

(21) Appl. No.: 12/869,529

(22) Filed: Aug. 26, 2010

(65) Prior Publication Data
US 2012/0054121 A1 Mar. 1, 2012

(51) Int. Cl.
*G06Q 40/00* (2012.01)

(52) U.S. Cl.
USPC .............. 705/36 R; 705/36; 705/35; 705/37; 705/4; 705/30

(58) Field of Classification Search
None
See application file for complete search history.

(56) References Cited

U.S. PATENT DOCUMENTS

| | | | | |
|---|---|---|---|---|
| 5,608,620 | A * | 3/1997 | Lundgren | 705/1.1 |
| 5,644,727 | A * | 7/1997 | Atkins | 705/40 |
| 5,884,287 | A | 3/1999 | Edesess | |
| 5,893,079 | A | 4/1999 | Cwenar | |
| 5,911,136 | A | 6/1999 | Atkins | |
| 5,999,918 | A | 12/1999 | Williams et al. | |
| 6,021,397 | A * | 2/2000 | Jones et al. | 705/36 R |
| 6,161,098 | A * | 12/2000 | Wallman | 705/36 T |
| 6,321,212 | B1 * | 11/2001 | Lange | 705/36 R |
| 6,360,210 | B1 | 3/2002 | Wallman | |
| 6,484,152 | B1 | 11/2002 | Robinson | |
| 6,839,686 | B1 * | 1/2005 | Galant | 705/36 R |
| 7,340,425 | B2 | 3/2008 | Boyle et al. | |
| 7,373,324 | B1 | 5/2008 | Engin et al. | |
| 7,403,918 | B2 | 7/2008 | Kochansky | |
| 7,512,555 | B2 | 3/2009 | Finn | |
| 7,577,597 | B1 | 8/2009 | Allison et al. | |
| 7,672,890 | B2 | 3/2010 | Hernandez | |
| 2001/0037289 | A1 * | 11/2001 | Mayr et al. | 705/38 |
| 2002/0038273 | A1 | 3/2002 | Wherry et al. | |
| 2002/0143680 | A1 | 10/2002 | Walters et al. | |
| 2002/0147671 | A1 | 10/2002 | Sloan et al. | |
| 2003/0093352 | A1 * | 5/2003 | Muralidhar et al. | 705/36 |
| 2003/0208429 | A1 | 11/2003 | Bennett | |
| 2003/0212621 | A1 | 11/2003 | Poulter et al. | |

(Continued)

FOREIGN PATENT DOCUMENTS

| | | |
|---|---|---|
| JP | 2005141694 A | 6/2005 |
| WO | 99/56192 A2 | 11/1999 |

(Continued)

OTHER PUBLICATIONS

"CUSIP Global Services", accessed from http://www.cusip.com/cusip/about-cgs.htm on Aug. 12, 2010, 5 pages.

(Continued)

*Primary Examiner* — Hai Tran
(74) *Attorney, Agent, or Firm* — Thompson Coburn LLP

(57) ABSTRACT

Methods and systems are disclosed that enable the leveraging of financial instrument research at an individual financial instrument level but across multiple classifications of financial instruments to efficiently build an investment portfolio for an investor based on a desired portfolio objective through a plurality of graphical user interfaces (GUIs).

19 Claims, 20 Drawing Sheets

(56) References Cited

U.S. PATENT DOCUMENTS

| | | |
|---|---|---|
| 2004/0267651 A1 | 12/2004 | Jenson et al. |
| 2005/0273413 A1 | 12/2005 | Vaudrie |
| 2006/0031149 A1 | 2/2006 | Lyons et al. |
| 2007/0130043 A1* | 6/2007 | O'Shaughnessy et al. . 705/36 R |
| 2007/0192224 A1 | 8/2007 | Quayle et al. |
| 2008/0071702 A1 | 3/2008 | Howard et al. |
| 2008/0294571 A1 | 11/2008 | Maloney et al. |
| 2009/0248589 A1 | 10/2009 | Snyder et al. |
| 2009/0276374 A1* | 11/2009 | Viner .......................... 705/36 T |

FOREIGN PATENT DOCUMENTS

| | | |
|---|---|---|
| WO | 03/075122 A2 | 9/2003 |
| WO | 2008/135511 A1 | 11/2008 |
| WO | 2008/138065 A1 | 11/2008 |

OTHER PUBLICATIONS

"CUSIP", accessed from http://en.wikipedia.org/wiki/Cusip on Aug. 12, 2010, 3 pages.

"ETF Research Center—Portfolio Builder", accessed from http://www.etfresearchcenter.com/our_tools.php on Jan. 26, 2011, 7 pages.

"Morningstar Portfolio Builder Product Fact Sheet", dated Oct. 1, 2009, accessed from http://corporate.morningstar.com/us/asp/detail.aspx?xmlfile=2790.xml on Jan. 26, 2011, 3 pages.

"Morningstar Portfolio Builder Quick Start Guide", dated Mar. 3, 2008, accessed from http://corporate.morningstar.com/us/asp/detail.aspx?xmlfile=2794.xml on Jan. 26, 2011, 10 pages.

American Funds Adviser Center, "Portfolio Planner", 8 pages.

E*Trade, Stock & Fund Screeners, https://us.etrade.com/e/t/activetrading/stockandfundscreeners, accessed on Mar. 17, 2010, 1 page.

Hedgeable, How it Works, http://www.hedgeable.com/howitworks, accessed on Mar. 17, 2010, 2 pages.

Internet Archive Wayback Machine, "http://corporate.morningstar.com" for Mar. 25, 2008, accessed through http://web.archive.org on Jan. 31, 2011, 8 pages.

Internet Archive Wayback Machine, "http://www.etfresearch.com" for Apr. 13, 2008, accessed through http://web.archive.org on Jan. 31, 2011, 11 pages.

Internet Archive Wayback Machine, "http://www.smartmoney.com/fundbuilder/" for Mar. 27, 2008, accessed through http://web.archive.org on Jan. 28, 2011, 3 pages.

Morningstar U.S., Portfolio Construction, http://corporate.morningstar.com/us/asp/subject.aspx?xmlfile=2785.xml, accessed on Mar. 17, 2010, 1 page.

Morningstar, "Portfolio Builder", accessed from http://corporate.morningstar.com/us/asp/subject.aspx?xmlfile=586.xml on Jan. 26, 2011, 109 pages.

Oppenheimer Funds, Building a Portfolio, https://www.oppenheimerfunds.com/articles/article_01-07-10-102802.jsp, accessed on Mar. 17, 2010, 2 pages.

Smart Money, "Fund Builder-Tools-Fund Builder-SmartMoney.com", accessed from http://www.smartmoney.com/fundbuilder/ on Jan. 26, 2011, 2 pages.

* cited by examiner

Product Table 210

| Product Name (212) | Product Unique Identifier (214) | Product Type (216) | Product Subtype (218) | Asset Class (220) | Asset Class Type (222) | Asset Class Subtype (224) | Suitability Category (226) | Domestic/ International Flag (228) |
|---|---|---|---|---|---|---|---|---|
| ... | ... | ... | ... | ... | ... | ... | ... | ... |

Figure 2(b)

Strategy Table 230

| Portfolio Objective (232) | Asset Class 1 Component (234) | Asset Class 2 Component (236) | Suitability Category 1 Component (238) | Suitability Category 2 Component (240) | Suitability Category 3 Component (242) | Suitability Category 4 Component (244) | Suitability Category 5 Component (246) | |
|---|---|---|---|---|---|---|---|---|
| ... | ... | ... | ... | ... | ... | ... | ... | ... |

Figure 2(c)

Product Type/Subtype Table 250

| Product Subtype | Product Type | Asset Class |
|---|---|---|
| Individual Stock - non REIT | Stocks | Equity |
| Individual Stock - REIT | Stocks | Equity (NC/RE) |
| Broad-based Equity ETF | ETF | Equity |
| Broad-based Income ETF | ETF | Income |
| Sector ETF | ETF | Equity |
| Niche ETF | ETF | Equity or Cash/Income |
| Equity UIT | UIT | Equity |
| Bond UIT | UIT | Income/Cash |
| Equity Mutual Fund | Mutual Fund | Equity |
| Indv. Taxable Fixed-Income Security | Bonds | Cash/Income |
| Fixed Annuity | Annuity | Cash/Income |
| Bond Fund | Mutual Fund | Cash/Income |
| Cash Deposit | Cash | Cash/Income |
| Money Market Fund | Cash | Cash/Income |
| Insured Bank Deposit | Cash | Cash/Income |
| Variable Annuity | Annuity | Equity and Cash/Income |
| Balanced Mutual Fund | Mutual Fund | Equity and Cash/Income |
| Asset Allocation Mutual Fund | Mutual Fund | Equity and Cash/Income |
| Advisory Solution | Advisory Service | Equity and Cash/Income |

Figure 2(d)

Asset Class/Type/Subtype Table 252

| Asset Class | Asset Class Type | Asset Class Subtype |
|---|---|---|
| Equity | Core | N/A |
| Cash/Income | Core | N/A |
| Equity | Noncore | Emerging Markets |
| Equity | Noncore | Natural Resources |
| Equity | Noncore | Real Estate |
| Cash/Income | Noncore | Aggressive Income |

Figure 2(e)

Suitability Category Table 254

| Suitability Category |
|---|
| Aggressive |
| Growth |
| Growth and Income |
| Income |
| Aggressive Income |
| Cash |

Figure 2(f)

Mixed Asset Classes Table 256

| Product Name | Product Unique Identifier | Asset Class 1 Component | Asset Class 2 Component |
|---|---|---|---|
| ... | | | |

Figure 2(g)

ETF Table 258

| Product Name | Product Unique Identifier | ETF Component |
|---|---|---|
| ... | | |

Figure 2(h)

Stock Table 260

| Product Name | Product Unique Identifier | Sector |
|---|---|---|
| ... | | |

Figure 2(i)

Solutions Desktop - Windows Internet Explorer http://jonesapp.edwardjones.com/GUI/p105216/solutionsBased/V5/input.htm

Portfolio Builder for: BOSS, JAMES H & LAUREN M

Portfolio Builder Objective and Pricipal to Invest
Objective: Balanced Towards Growth — 502
Amount: $ _____ — 504
Name on report: _____ — 506

Portfolio Options
Selection preference: ● Research-driven
○ Custom
Tax treatment: ○ Qualified (must create at least two alternatives) - see Policy for Retirement Accounts — 508
○ Non-qualified

Cash and Liquidity
Portfolio cash: $ _____ OR 0 _____ %  (suggested = 0% to 10% of portfolio)
Type: ● Money market taxable
○ Money market tax-free       — 512
○ Cash
510

Equity
Select one: ● Equity funds
○ Individual stocks        — 514
○ Combination of equity funds and individual stocks

Income
Select one: ● Bond funds
○ Individual bonds
○ Combination of individual bonds and bond funds    — 516
○ Combination of UITs and bond funds
Preferred tax treatment: ● Taxable
○ Tax-free

Fund Families and ETFs
Primary: [Click to select ▼]
Secondary: [Click to select ▼] [✓] (optional)

Figure 5(a)

Industrial Stocks

Edward Jones Research Buys

| Name | Symbol | Category | |
|---|---|---|---|
| ☐ BHP BILLITON PLC ADR | BBL | G | |
| ☐ BOEING CO | BA | G | |
| ☐ CANADIAN NATIONAL RAILWAY CO | CNI | G | |
| ☐ CANADIAN PAC RY LTD COM | CP | G | |
| ☐ CH ROBINSON WORLDWIDE INC | CHRW | G | |
| ☐ DOVER CORP | DOV | G | |
| ☐ ECOLAB INC | ECL | G | Focus List |
| ☐ FEDEX CORP | FDX | G | |
| ☐ GENERAL DYNAMICS CORP | GD | G | Focus List |

[Add] [Dismiss]

Figure 7(b)

Taxable Unit Investment Trusts

| | Name | Symbol | Category |
|---|---|---|---|
| ☐ | FIRST TRUST BLD AMER BDS #16 | BABP16 | Inc |
| ☐ | FT BLD AMER BDS 10-20 YR #6 | BATT6 | Inc |
| ☐ | INVESCO BLD AMER BD INCM TR 44 | BABS44 | Inc |
| ☐ | VK INTERMED INVT GRADE TR #57 | VIGT57 | Inc |

[Add] [Dismiss]

Figure 9(b)

| Federated and Lord Abbett Focus List Equity Funds | | | | |
|---|---|---|---|---|
| Edward Jones Focus List | | | | |
| Name | Symbol | Category | Fund Style | Int'l% |
| Federated | | | | |
| ☐ FEDERATED KAUFMANN SMALL CAP A | FKASX | A | Small Growth | 25.0 |
| ☐ FEDERATED MID CAP GRW STRATS A | FGSAX | A | Mid-Cap Growth | 0.0 |
| ☐ FEDERATED CLOVER VALUE FUND A | VFCAX | G&I | Large Value | 0.0 |
| ☐ FEDERATED MUN & STOCK ADVTG # | FMUAX | G&I | Conservative Alloc | 0.0 |
| Lord Abbett | | | | |
| ☐ LORD ABBETT SAMLL CAP BLEND A | LSBAX | A | Small Growth | 0.0 |
| ☐ LORD ABBETT CLASSIC STOCK FD A | LRLCX | G | Large Blend | 0.0 |
| ☐ LORD ABBETT FUNDAMENTAL EQU A | LDFVX | G | Large Blend | 0.0 |
| ☐ LORD ABBETT INTL CORE EQUITY A | LICAX | G | Foreign Large Blend | 100.0 |
| ☐ LORD ABBETT SM CAP VALUE FD | LRSCX | G | Small Blend | 0.0 |

[Add] [Dismiss]

Figure 10(b)

Federated and Lord Abbett Focus List Niche Funds

Edward Jones Focus List

| Name | Symbol | Category | Fund Style | Int'l% |
|---|---|---|---|---|
| Emerging Markets | | | | |
| ☐ INVESCO DEVELOPING MARKTS FD A | GTDDX | A | Divsifd Emerging Mkts | 100.0 |
| ☐ OPPENHEIMER DEVELOPING MKTS A | ODMAX | A | Divsifd Emerging Mkts | 100.0 |
| Aggressive Income | | | | |
| ☐ FEDERATED CAPITAL INCOME FD # | CAPAX | G&I | Conservative Alloc | 30.0 |
| ☐ FRANKLIN INCOME FUND CL A # | FKINX | G&I | Conservative Alloc | 0.0 |
| ☐ LORD ABBETT DIVERS INC STRAT # | ISFAX | G&I | Conservative Alloc | 0.0 |
| ☐ AMERN HIGH INCM MUNI BD FD A | AMHIX | AI | High Yield Muni | 0.0 |
| ☐ AMERN HIGH INCOME TRUST CL A | AHITX | AI | High Yield Bond | 20.0 |
| ☐ FEDERATED BOND FUND CL A | FDBAX | AI | Interm-Term Bond | 15.0 |
| ☐ FEDERATED INTL BOND FUND CL A | FTIIX | AI | World Bond | 100.0 |
| ☐ FEDERATED MUN HIGH YLD ADVTG A | FMOAX | AI | High Yield Muni | 0.0 |

[Add] [Dismiss]

Figure 10(c)

EdwardJones

Proposed Portfolio
Portfolio Objective: Balanced Toward Growth
Page 2 of 2

| Ted Jones<br>Financial Advisor | Prepared for: John Smith | | | | | May 20, 2009 |

| Stocks | Symbol | Investment Category | Value | % of Portfolio | Projected Annual Income | Projected Yield |
|---|---|---|---|---|---|---|
| 3M | MMM | Growth & Income | $20,000 | 2.0% | $200 | 1.0% |
| Southern Company | SO | Growth & Income | $20,000 | 2.0% | $300 | 1.5% |
| Home Depot | HD | Growth & Income | $20,000 | 2.0% | $300 | 1.5% |
| Pfizer | PFE | Growth & Income | $20,000 | 2.0% | $400 | 2.0% |
| Total Stocks | | | $200,000 | 20.0% | $1,600 | 0.8% |

| Fixed Income | | Investment Category | Value | % of Portfolio | Projected Annual Income | Projected Yield |
|---|---|---|---|---|---|---|
| Six to eight taxable fixed-income securities diversified by maturities and issuer based on availability | | Income | $80,000 | 8.0% | $3,900 | 4.9% |
| Certificate of Deposits (CDs) subject to FDIC limits | | Income | $45,000 | 4.5% | $900 | 2.0% |
| Total Fixed Income | | | $125,000 | 12.5% | $4,800 | 3.8% |

| Unit Investment Trusts (UITs) | Symbol | Investment Category | Value | % of Portfolio | Projected Annual Income | Projected Yield |
|---|---|---|---|---|---|---|
| Van Kampen Intermediate Corporate Investment Grade | VIGT54 | Income | $50,000 | 5.0% | $1,955 | 3.91% |
| Van Kampen Long-term Grade Trust | LIGT | Income | $50,000 | 5.0% | $2,760 | 5.52% |
| Total UITs | | | $100,000 | 10.0% | $4,715 | 9.43% |

| Variable Annuities | | Investment Category | Value | % of Portfolio | Estimated Annual Income | Projected Yield |
|---|---|---|---|---|---|---|
| Sun Life Variable Annuity with Balanced Toward Growth Objective[1] | | Various | $200,000 | 20.0% | -- | -- |
| Total Variable Annuities | | | $200,000 | 20.0% | -- | -- |

| Cash and Cash Equivalents | Symbol | Investment Category | Value | % of Portfolio | Projected Annual Income | Projected Yield |
|---|---|---|---|---|---|---|
| Edward Jones Money Market | | | $25,000 | 2.5% | -- | 0.0% |
| Total Cash | | | $25,000 | 2.5% | -- | 0.0% |

| Total Proposed Portfolio | $1,000,000 | 100% | $25,155 | 2.5% |

[1] Purchasing variable annuities have certain requirements including age limitations. Also, no projected income is provided because withdrawal limits exist based on specific contact purchased. (final text to be provided by Steve Melichar)

Figure 12(b)

METHOD AND SYSTEM FOR BUILDING AN INVESTMENT PORTFOLIO

BACKGROUND AND SUMMARY OF THE DISCLOSURE

One of the more time-consuming and challenging tasks for financial advisors is the task of building investment portfolios for their customers such that the portfolio is populated with a diversified set of investment products that align with the investor's goals.

Many research analysts are employed within the financial services industries to analyze investment products and assess their value.

Exemplary embodiments of the present invention are directed toward the design of a method and system such that financial advisors are able to efficiently leverage such financial research when building investment portfolios for their customers. Associations between individual financial instruments and any of a plurality of portfolio objectives can be used by the exemplary systems and methods disclosed herein to automatically populate investment portfolios for investors with particular financial instruments based on a desired portfolio objective for an investor. Graphical user interfaces (GUIs) that are segmented by different classification groups of financial instruments can then be used to guide a user through the portfolio to ensure that the investor's portfolio meets desired diversification criteria and other goals of the investor.

These and other features and advantages of the present invention will be apparent to those having ordinary skill in the art upon a review of the disclosure herein.

BRIEF DESCRIPTION OF THE DRAWINGS

FIGS. 2(b)-(i) depict exemplary data structures that can be stored in a database to support the portfolio building software;

FIG. 7(b) depicts an exemplary "add stock" page accessed from the page of FIG. 7(a);

FIG. 9(b) depicts an exemplary "add UIT" page accessed from the page of FIG. 9(a);

FIGS. 10(b) and (c) depict exemplary "add mutual funds" pages accessed from the page of FIG. 10(a);

DETAILED DESCRIPTION OF THE PREFERRED EMBODIMENTS

Figure 1:
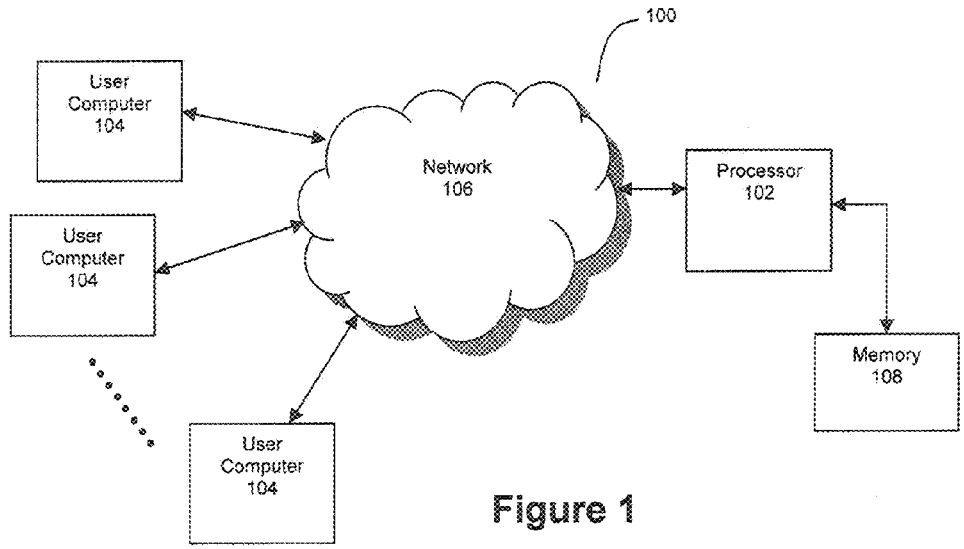
FIG. 1 depicts an exemplary system in which exemplary embodiments of the present invention can be employed.

FIG. 1 illustrates an exemplary system architecture for an exemplary embodiment of the present invention. The system 100 comprises a processor 102 in communication with a memory 108. The processor 102 can be any processor with sufficient computational power for carrying out the processes described herein. For example, the processors within standard off-the-shelf servers are suitable. It should also be understood that the processor 102 can comprise a plurality of processors, such as distributed processors on separate servers, different processing cores on a multi-processor, etc. The memory 108 can be any device for storing data, such as the hard drive of a computer, whether the data be stored as files in a file system, as records in a database, or the like (or some combination thereof). It should also be understood that the memory 108 can, if desired, be distributed across a plurality of memory devices.

The processor 102 is preferably configured for communicating with one or more user computers 104 via a communications network 106. The communications network 106 may comprise any data communication network, such as the Internet, a private wide area network (WAN) or a private local area network (LAN). The user computers 108 can be devices such as personal computers, workstations, laptop, notebook or tablet computers, mobile telephones (e.g., smart phones, cell phones, etc.) configured with user interface features and network connectivity so long as these devices have sufficient processing power and user interface capabilities to perform the operations described herein in accordance with an exemplary embodiment.

A likely user of a user computer 104 is a financial advisor having a client with investment needs. However, this need not be the case. For example, the user can be a person who wants to build an investment portfolio for himself/herself directly.

In an exemplary embodiment, processor 102 is configured with code (e.g., a software application) for execution by the processor to perform a portfolio building operation in response to input from a user. In doing so, the code interacts with data stored in memory 108 to retrieve data about financial instruments that are candidates for inclusion in an investment portfolio.

Figure 2A:
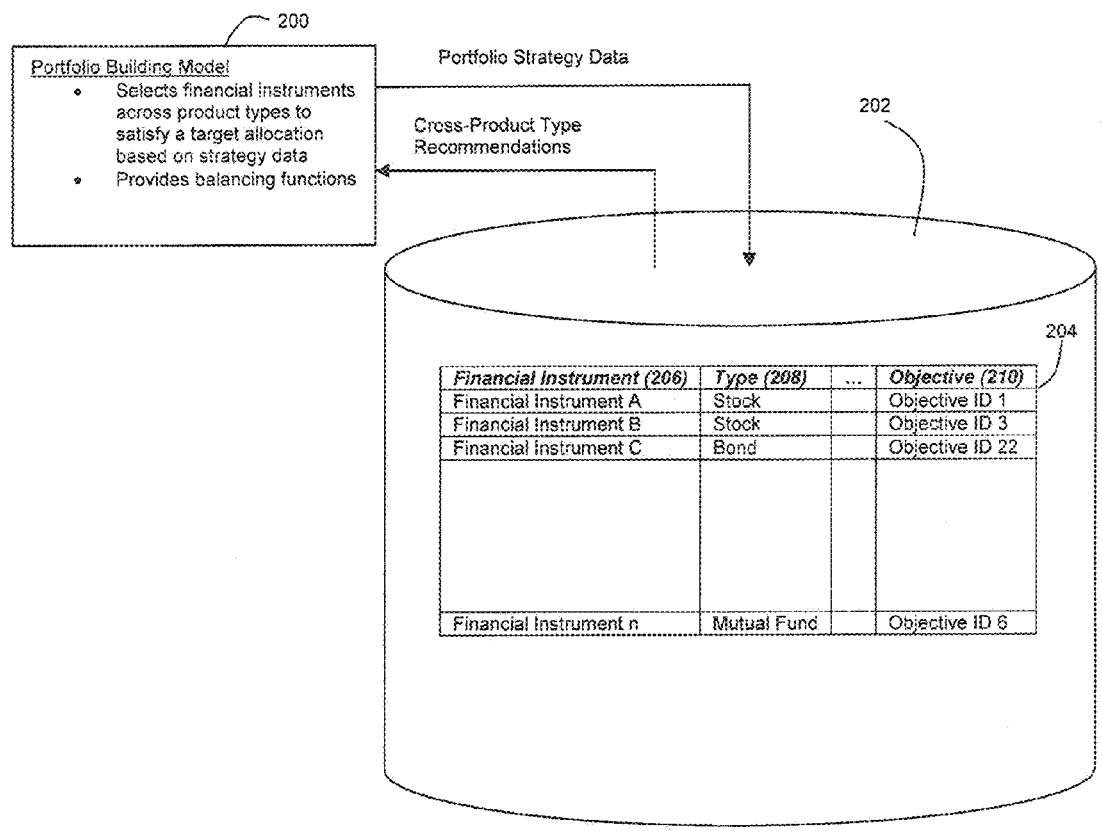
FIG. 2(a) depicts an exemplary embodiment showing how portfolio building software can interact with a database of financial instruments.

FIG. 2(a) depicts an exemplary embodiment where a software application 200 interacts with a database 202 to identify appropriate financial instruments for inclusion in an investment portfolio. The database 202 is resident in memory 108. It should be understood that database 202 may take the form of multiple data structures having associations with each other. Database 202 can be populated with data structures representative of a plurality of different financial instruments as indicated by the exemplary table 204 shown in FIG. 2(a). As used herein, a "financial instrument" refers to an instrument representing equity ownership, debt or credit, typically in relation to a corporate or governmental entity, wherein the instrument is saleable. Examples of "financial instruments" include stocks, bonds, unit investment trusts (UITs), mutual funds, exchange traded funds (ETFs), money market funds, etc. As should be well understood, there are many different types of financial instruments. As used in connection with financial instruments, the term "classification group" refers to a grouping of multiple financial instruments by one or more type classifications. The database 202 preferably associates each financial instrument product that is eligible for inclusion in an investment portfolio by one or more classifications. As explained herein, such classifications can be overlapping or non-overlapping depending on the financial instrument.

In the example of FIG. 2(a), it can be seen that table 204 associates a plurality of financial instruments 206 with (1) data 208 that identifies a type classification for the subject financial instrument (e.g., stocks, bonds, mutual funds, etc.), and (2) data 210 that serves to associate the financial instrument with a particular portfolio objective (e.g., an objective identifier corresponding to an investment strategy). This objective identifier can further serve to identify that the corresponding financial instrument is a recommended investment for a customer having an investment strategy corresponding to that financial instrument's associated objective identifier.

Research analysts can populate the database 202 with data such as that shown in table 204 for financial instruments, particularly the objective identifiers 210 to thereby flag particular financial instruments for recommendation with respect to particular portfolio objectives. It should be noted that a given financial instrument can be associated with multiple portfolio objectives. Thus, data 210 can identify one or more portfolio objectives for which the relevant financial instrument is a recommended investment. A practitioner of such an exemplary embodiment can devise any of a number of different portfolio objectives as desired. However, it should be understood that the exemplary embodiment is not limited to any particular portfolio objective or to any particular allocation of financial instruments to one or more portfolio objectives.

It should also be understood that data 210 can be used to directly or indirectly associate financial instruments with portfolio objectives. For example, a practitioner may want to configure the database 202 such that different financial instruments are assigned grades or the like that identify varying levels of suitability for investment. Then, data corresponding to different portfolio objectives can be associated with the suitability grades that financial instruments have to be deemed recommended products. In this way, portfolio objectives can be indirectly associated with individual financial instruments. In such an arrangement, the data 210 would be the combination of the financial instrument suitability grade and other data that relates the suitability grade to a portfolio objective. Thus, indirect associations can be made between financial instruments and portfolio objectives via one or more linking keys in one or more database tables. An example of such an arrangement is described in connection with FIGS. 2(b)-(i).

In the example of FIG. 2(b), database 202 can maintain a table 210 of financial instrument products eligible for inclusion in a portfolio. Each financial instrument can be represented by a name (field 212) and a unique identifier (field 214). The unique identifier serves to uniquely identify a financial instrument at an individual financial instrument level. An example of a unique identifier that can be employed for many financial instruments is a CUSIP identifier. CUSIP is a registered trademark of the American Bankers Association. A CUSIP identifier is an alphanumeric code used to identify North American financial instruments.

The database 202 also preferably associates each financial instrument with an asset class (field 220). The asset class field 220 is an example of one of the classifications into which financial instruments can be categorized. In an exemplary embodiment, the database 202 can exhibit two asset classes—an equity asset class and a cash/income asset class. However, it should be understood that other asset classes could be employed. It should also be understood that a given financial instrument can be associated with both the equity and the cash/income asset class if appropriate given the nature of the financial instrument.

The database 202 can also associate financial instruments with an asset class type (field 222), another example of a classification into which financial instruments can be categorized. In an exemplary embodiment, the database 202 can exhibit two asset class types—core and non-core. The non-core asset class types can be further categorized according to an asset class subtype (field 224). In an exemplary embodiment, the asset class subtype values can be emerging markets, natural resources, real estate and aggressive income. With such an example, the first three of these can fall under the equity asset class while the final one of these can fall under the cash/income asset class, as shown in the exemplary asset class/type/subtype table 252 of FIG. 2(e).

The database 202 can further associate financial instruments with a product type (field 216), yet another example of a classification into which financial instruments can be categorized. Examples of product types that can be employed with an exemplary embodiment include equities, income products, cash products, annuities, mutual funds, unit investment trusts (UITs), advisory services, etc. Various product types can also have a subtype (field 218), which further classifies a particular product type. An example of such an arrangement is shown in the product type/subtype table 250 of FIG. 2(d). For example, with respect to the "stocks" product type (falling under the equities asset class), exemplary product subtypes can be individual stocks, both non-REIT (real estate investment trust) individual stocks and REIT individual stocks. With respect to the "ETF" (exchange-traded funds) product type, exemplary subtypes can be broad-based equity ETFs, broad-based income ETFs, sector ETFs and niche ETFs. Table 250 further identifies how these different product types and subtypes relate to the asset classes.

It should also be understood that financial instrument products can be associated with more than one asset class. For example, many financial instrument products have both equity and cash/income components. Such financial instruments can be characterized as belonging to a mixed asset class. For these financial instruments, the database 202 can maintain data that defines how much of the subject financial instrument falls into the different asset classes (see for example, the mixed asset classes table 256 of FIG. 2(g)). In this example, percentages (or percentage ranges) can be specified in the "Asset Class 1 Component" and "Asset Class 2 Component" to denote what portion of the subject financial instrument is comprised of the equity asset class and what portion of the subject financial instrument is comprised of the cash/income asset class. Examples of financial instrument product types and subtypes that often fall into multiple asset classes are variable annuities, balanced mutual funds, asset allocation mutual funds and advisory solutions, as shown in FIG. 2(d).

Further still, some financial instruments are themselves comprised of multiple financial instruments. An ETF is a prime example of this. An ETF is a financial instrument that itself comprises a plurality of constituent financial instruments. To track the constituent financial instruments of an ETF, the database 202 can maintain an ETF table 258 such as the exemplary one shown in FIG. 2(h). Table 258 identifies particular ETFs with their constituent financial instrument components. Thus, a search can be performed on table 258 to find all constituent financial instruments for a particular ETF. It should be understood that the database 202 can maintain similar tables for other financial instruments that are collections of multiple component financial instruments.

For stocks, the database 202 can maintain a table such as table 260 shown in FIG. 2(i) whereby individual stocks are associated with an industry sector. Examples of industry sectors which can be associated with company stocks are communications, utilities, consumer staples, energy, health care, financial services, industrials, consumer discretionary and technology. As explained below, such associations can be leveraged when diversifying an investment portfolio. It should be further understood that financial instruments other than stocks that are amenable to classification within a sector can also be associated with a sector within the database. For example, many ETFs are amenable to classifications in one or more sectors as can be mutual funds.

Returning to FIG. 2(b), each financial instrument product can also be associated with a suitability category (field 226). This field 226 serves to identify whether research analysts have deemed the subject financial instrument product a suitable recommendation with respect to one or more criteria, as explained below. Examples of different suitability categories that can populate field 226 are shown in the suitability category table 254 of FIG. 2(f). For example, options for suitability categories can be aggressive, growth, growth and income, income, aggressive income and cash. It should be understood that more, fewer or different suitability categories could be employed if desired by a practitioner. Furthermore, certain suitability categories can be available for association with only financial instruments of a particular asset class if desired. For example, with respect to FIG. 2(f), the aggressive, growth and growth and income categories can be limited to associations with financial instruments falling within the equities asset class while the income, aggressive income and cash suitability categories can be limited to associations with financial instruments falling within the cash/income asset class.

In this example, field 226 is used to indirectly associate financial instrument products with portfolio objectives. With such an exemplary embodiment, a strategy table 230 such as the one shown in FIG. 2(c) can provide the indirect linkage between financial instrument products and portfolio objectives via the suitability category.

Table 230 comprises a plurality of portfolio objectives (field 232). Database 202 preferably associates each portfolio objective 232 with data that establishes an asset allocation mix between the different asset classes, for example an "Asset Class 1 Component" (field 234) and an "Asset Class 2 Component" (field 236). Fields 234 and 236 can be specified in terms of percentages (or percentage ranges) of the overall portfolio that financial instruments classified within the subject asset class should comprise. As an example, the different portfolio objectives (and their associated asset allocation percentages as between the equities and cash/income asset classes) can be the following:

"All Equity" objective (100%/0%)
"Growth Focus" objective (80%/20%)
"Balanced Toward Growth" objective (65%/35%)
"Balanced Toward Growth and Income" objective (50%/50%)
"Balanced Toward Income" objective (35%/65%)
"Income Focus" objective (20%/80%)
Preservation of Principal" objective (0%/100%)

It should be understood that these portfolio objectives and corresponding asset allocation percentages are exemplary only. More, fewer and different portfolio objectives could be employed, as could different asset allocation percentages.

In addition to table 230 defining an appropriate asset class mix for a given portfolio objective, table 230 can further define an allocation mix with respect to different suitability categories for that portfolio objective (see fields 238, 240, 242, 244 and 246 in FIG. 2(c)). These suitability category components can be expressed in terms of percentages (or ranges of percentages) with respect to the overall portfolio. Building on the exemplary list of portfolio objectives above and the exemplary suitability categories of FIG. 2(f), the suitability categories components for the "Balanced Toward Growth" portfolio objective can be the following:

Aggressive: 0%-10%
Growth: 15%-25%
Growth & Income: 35%-45%
Income: 25%-35%
Cash: 0%-10%

As noted above, the first three of these suitability categories correspond to the equities asset class while the latter two correspond to the cash/income asset class. Thus, from the perspective of the midpoints of these target ranges for suitability categories, a portfolio built with these suitability category targets would result in a portfolio populated with financial instruments within an equities asset class that constitute 65% of the portfolio and financial instruments within a cash/income asset class that constitute 35% of the portfolio. Once again, these target ranges for suitability categories within a portfolio objective are exemplary only. Furthermore, similar target ranges can be constructed for the suitability categories with respect to the other portfolio objectives.

Moreover, table 230 can further specify how allocations within the first and second asset classes are to be subdivided across other financial instrument classifications (e.g., target allocation percentages (or ranges of percentages) by product type and subtype with respect to each asset class).

It should be further understood that portfolio objectives can be further defined via one or more associations with other diversification criteria such as target investment ranges for different industry sectors. For example, a given portfolio objective might be associated via table 230 or otherwise with data that defines allocation mixes of financial instruments with respect to the different industry sectors by which stocks and other financial instruments can be classified.

To provide still further diversification, the database 202 can further associate financial instrument products with data that identifies whether the subject financial instrument product is classified as a "domestic" product or an "international" product (from the perspective of the United States market) (see field 228 in FIG. 2(b)). For any financial instrument products that span domestic and international markets, a practitioner may optionally further specify percentages of such instrument that are made up of a domestic component and an international component, similar to what is shown in FIG. 2(g) for financial instruments that span multiple asset classes. In scenarios where domestic/international diversification is desired, various portfolio objectives can also specify a target allocation (e.g., a percentage or range of percentages) for financial instruments with respect to geography classification 228 to further diversify the portfolio.

Research analysts or other authorized users can populate table 230 with appropriate data that defines the target investment ranges for certain classifications of financial instruments with respect to certain portfolio objectives. In this way, software 200 can leverage the database 202 to automatically populate an investment portfolio with individual financial instruments products in response to a user's specification of a portfolio objective. That is, the portfolio building software 200 can be configured to interact with a user to obtain a portfolio objective for the customer. Based at least in part on this portfolio objective, the software 200 interacts with the database 202 to retrieve financial instruments across a plurality of financial instrument classifications based on the portfolio objective. Thus, the set of financial instruments that can be identified based on a portfolio objective can be defined as $\{FI_1(1), FI_1(2), \ldots FI_2(1), \ldots Fi_n(n)\}$, wherein each $FI_i(k)$ corresponds to a particular financial instrument k of category i.

Such software 200 can optionally employ a balancing algorithm that culls one or more of the financial instruments from the set above in accordance with predefined balancing criteria (e.g., recommending only X number of energy sector stocks, keeping an N:M ratio of government bonds and financial services sector stocks, etc.). This culled set would then be used by the portfolio builder during the portfolio building process. Should a practitioner choose to implement a balancing algorithm, it should be understood that such a practitioner of the present invention is free to choose any desired criteria for performing such balancing.

Figure 3:
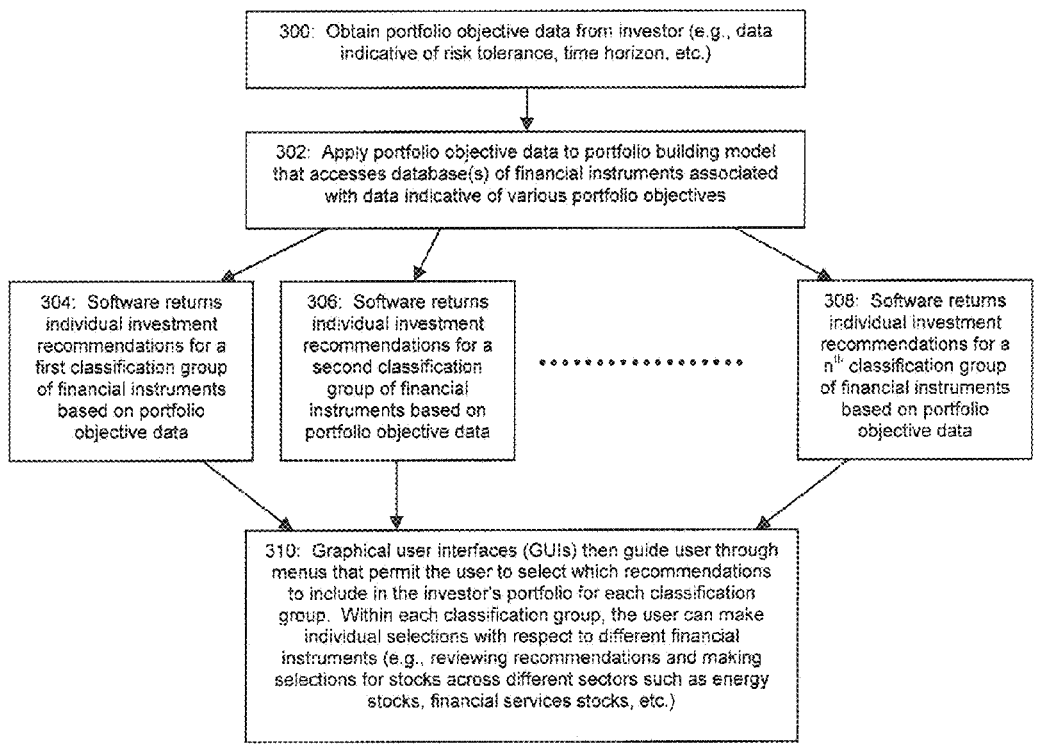
FIG. 3 depicts a flowchart showing a portfolio building process flow in accordance with an exemplary embodiment.

FIG. 3 depicts an exemplary process flow that can be employed by software 200 to guide a user through the portfolio building process. At step 300, the user inputs data indicative of a portfolio objective for an investor. This data can be directly indicative of the portfolio objective (where the data itself specifically identifies a portfolio objective) or indirectly indicative of the portfolio objective (e.g., where the user provides various items that the software 200 analyzes to identify the portfolio objective, such as translating a risk tolerance and time horizon for an investor into a portfolio objective). In either event, the software 200 is configured to determine a portfolio objective for the investor based on the data provided by the user at step 300.

At step 302, the software 200 applies the portfolio objective to the portfolio building model, and the portfolio building model accesses the database 202 to identify a set of recommended financial instruments for the determined portfolio objective. As explained above, this retrieval is driven by the data 210 with which the financial instruments in database 202 are associated.

Steps 304-308 identify that recommendations of individual financial instruments with respect to an investment portfolio are made for a plurality of different classifications of financial instruments. As noted above, preferably, the determined portfolio objective is also associated with a target diversification across financial instrument classifications. Using this portfolio objective-based target diversification, the software 200 can make recommendation selections of financial instruments for multiple financial instrument classifications in a manner that is consistent with the investor's portfolio objective. In an exemplary embodiment, this portfolio building operation can employ a build order with respect to different financial instrument classifications. That is, at step 304 the software 200 can populate a portfolio with recommendations for financial instruments in a first classification group of financial instruments (where this population aligns with the target diversification of the determined portfolio objective). Then, at step 306, the software 200 can proceed to a second classification group of financial instruments and populate the portfolio with recommendations from the second classification group (once again, maintaining the target diversification of the determined portfolio objective), and so on through step 308 for the nth classification group. An exemplary build order for steps 304-308 can be:

For the equities asset class: (1) the equity portion of variable annuity products, (2) equity mutual funds, (3) niche mutual funds, and (4) stocks;

For the cash/income asset class: (1) cash, (2) income portion of variable annuity products, (3) bond funds, (4) niche mutual funds, and (5) bonds.

Based on the data associated with the portfolio objective (see FIG. 2(*c*)), the software 200 can determine target diversification mixes for a plurality of different financial instrument classifications. The software 200 can then populate the portfolio with financial instrument products falling within these classifications until the target mix is achieved for each target classification mix. For example, where a record in FIG. 2(*c*) sets the guideposts for a portfolio, the software can loop through the build order mentioned above until the portfolio is populated with different financial instrument products that satisfy the various targets.

As noted above, any of a number of algorithms can be employed to select which of the eligible financial instruments should be included in the portfolio. For illustration, the attached appendix describes an exemplary stock selection algorithm that could be employed by the software 200 to decide which stocks are to be included in the portfolio.

Having identified the recommended financial instruments for these different financial instrument classification groups, the software 200 at step 310 provides various graphical user interfaces (GUIs) for access by the user to navigate through the process of reviewing and optionally modifying particular recommended financial instruments with respect to the investment portfolio. Examples of such GUIs are shown in FIGS. 4-11.

Figure 4:
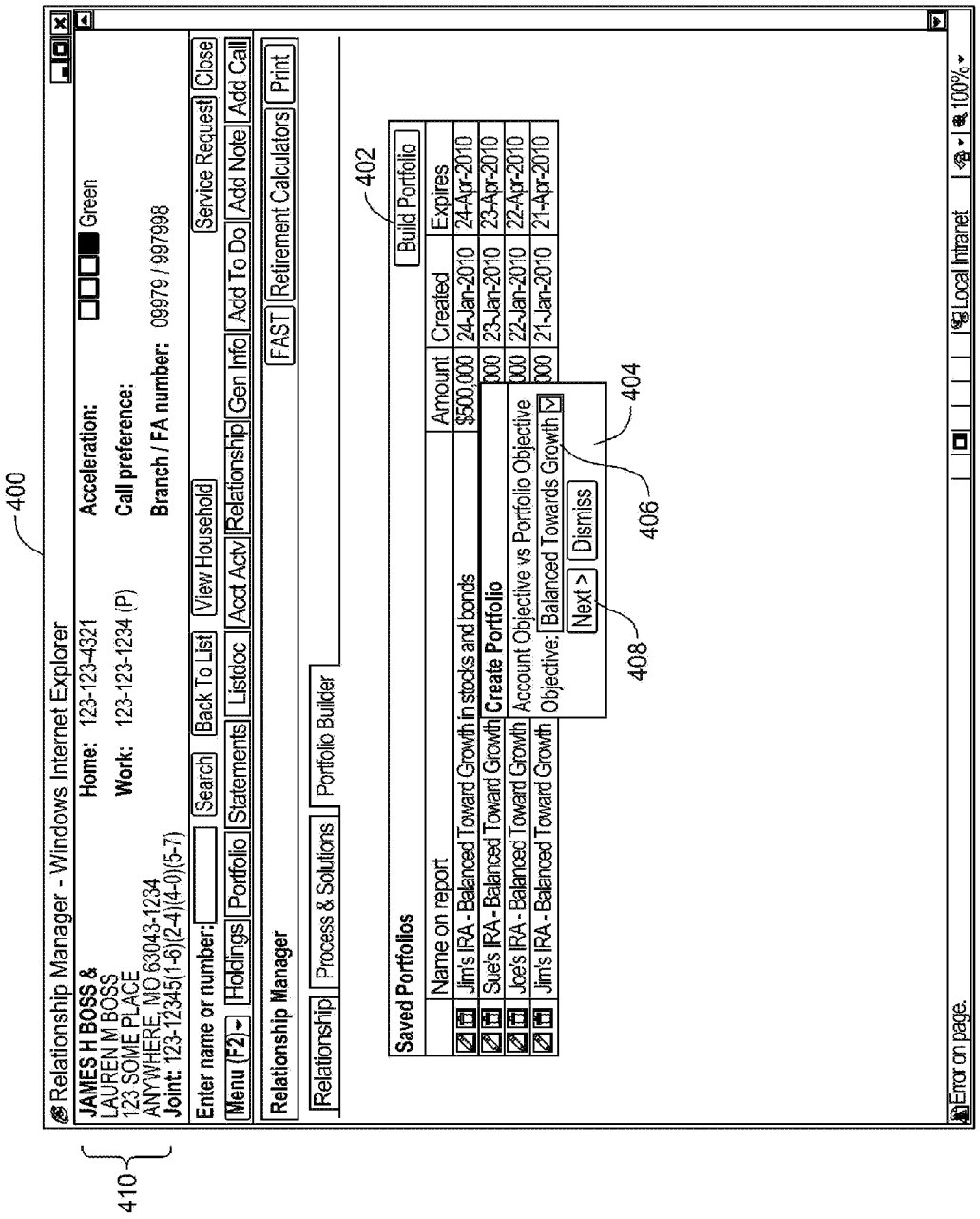
FIG. 4 depicts an exemplary page from which portfolio building software can be launched.

FIG. 4 depicts an exemplary GUI page 400 for display on a user computer 104 that is configured to launch the portfolio building software application 200 in response to user input. For example, in response to user selection of the "Build Portfolio" button 402 the software application 200 can be initiated, and a popup window 404 can be displayed. This popup window can include a field 406 through which the user can identify a portfolio objective. For example, field 406 may access a drop down menu of predefined portfolio objective options as described above in connection with FIG. 2(*c*). After selecting a portfolio objective, the user can select the "Next" button 408 to continue to the next GUI.

It should be noted that section 410 of GUI 400 identifies the investor for whom the portfolio is to be built. As indicated by GUI 400, it should also be understood that the portfolio building software application 200 can be accessed from within another financial service software application used by a user such as a financial advisor. However, this need not be the case as the software application 200 can also be its own standalone application.

Figure 5B:
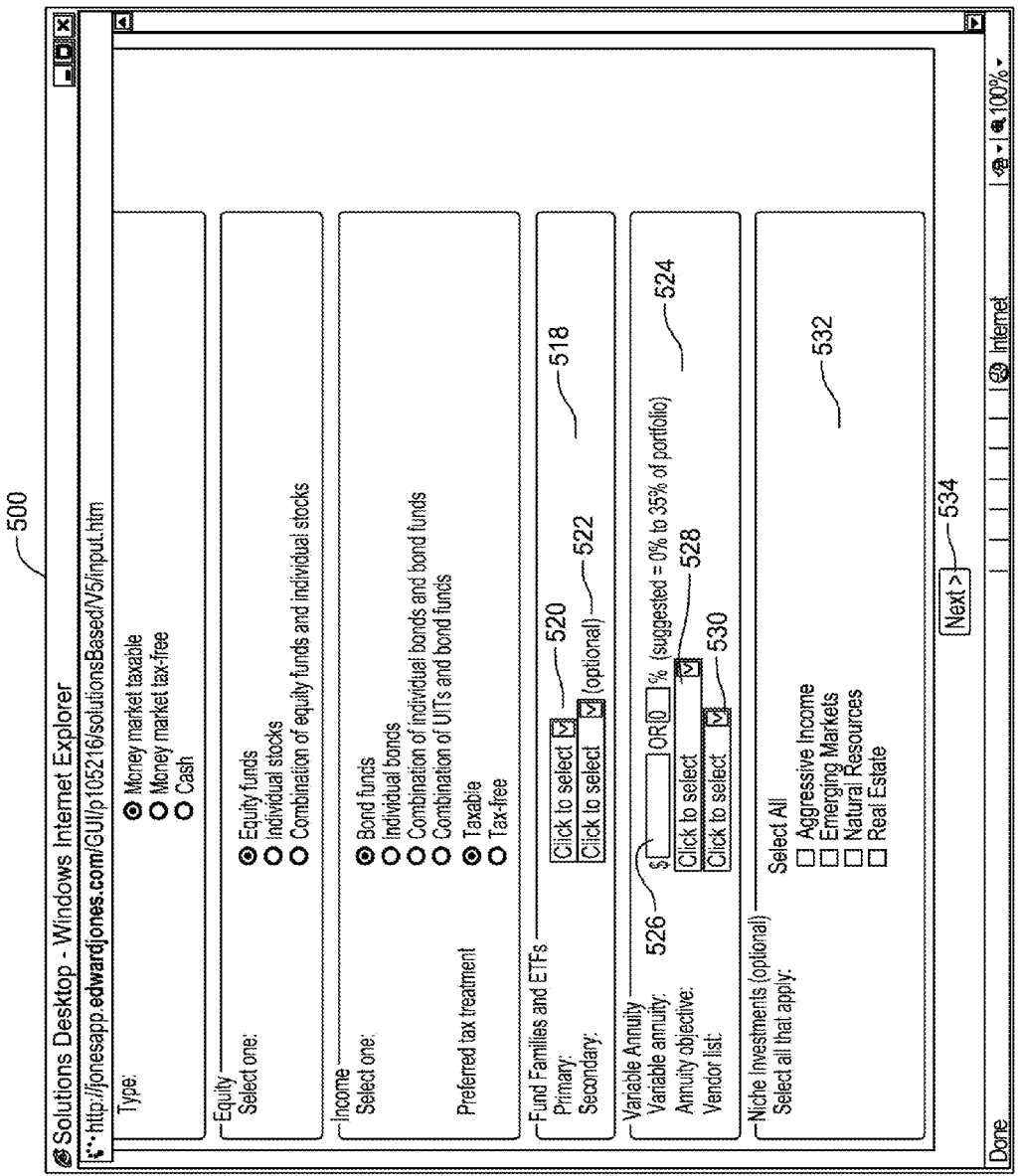
FIGS. 5(a) and (b) depict an exemplary page for defining various initiating characteristics for an investment portfolio.

FIGS. 5(*a*) and (*b*) depict an exemplary GUI 500 through which the user can define various initiating characteristics for an investment portfolio. At the top of GUI 500, the objective for the portfolio is identified at 502. Also, through field 504, the user can define a monetary amount for the portfolio. Moreover, through field 506, the user can define the name to appear in association with the portfolio on a report (preferably the investor's name).

Through section 508, the user can specify whether the portfolio is to be research-driven or custom-built. The embodiments of the invention disclosed herein correspond to a research-driven portfolio. Through section 508, the user can further specify a tax treatment for the portfolio, whereby the user can specify if the portfolio is qualified (e.g., an Individual Retirement Account (IRA) or non-qualified (e.g., a taxable account). The portfolio building software 200 can be configured to make selections from among financial instruments based on a portfolio's specified tax treatment. For example, this status can affect whether tax-free municipal bonds or taxable bond funds are selected from the portfolio.

Through field 510 and section 512, the user can define whether the portfolio is to include a cash component. If so, the user can enter a non-zero value in field 510 that identifies the amount of the cash component. Alternatively, the user can also enter a percentage value to be applied to the portfolio monetary amount defined via field 504, where this percentage will define how much of the total portfolio monetary amount is to be held in cash. The GUI can also display a recommended cash percentage for the portfolio in view of the portfolio objective (see FIG. 2(*c*)). Thereafter, via section 512, the user can select what type(s) of accounts the cash should be held in (e.g., a money market taxable account, a money market tax-free account and/or a basic cash account).

Via section 514, the user can define the scope of equity investment products that are eligible for inclusion in the portfolio. For example, the user can select whether the recommendations will include equity funds (e.g., sector ETFs), individual stocks or a combination thereof.

Via section 516, the user can define a scope of income products that are eligible for inclusion in the portfolio. For example, the user can define whether the recommendations will include bond funds, individual bonds, combinations of bond funds and individual bonds, combinations of UITs (that are classified within the cash/income asset class) and bond funds, etc. Also, the user can define a preferred tax treatment for the eligible bonds (namely, taxable or tax-free).

Via section 518, the user can define the scope of mutual funds and ETF investment products that are eligible for inclusion in the portfolio. During subsequent GUIs discussed below, it should be understood that sector ETF recommendations can be reviewed and modified via a GUI that focuses on stocks while broad-based ETF recommendations can be reviewed and modified via a GUI that focuses on mutual funds. However, if desired, a separate GUI dedicated to ETFs could be employed. Section 518 addresses whether broad-based ETFs are to be eligible for inclusion in the portfolio. For example, the user can define a primary fund family via field 520. Field 520 can be a dropdown menu populated by the fund families that are eligible for inclusion as a recommendation. Thereafter, the software 200 operates to provide recommendations on how much to invest in mutual funds and which specific mutual funds within the selected family to include in the recommendation. The user can also define a secondary fund family via field 522 if desired. Once again, field 522 can be a dropdown menu populated by the funds that are eligible for inclusion as a recommendation. The secondary fund family can serve as a source of mutual fund recommendations in the event that the primary fund family does not have a sufficiently diverse menu of mutual funds from which to make selections that would satisfy the diversification targets of the portfolio objective.

Through section 512, the user can define whether the portfolio is to include a variable annuity component. If so, the user can enter a non-zero value in field 526 that identifies the amount of the variable annuity component. Alternatively, the user can also enter a percentage value to be applied to the portfolio monetary amount defined via field 504, where this percentage will define how much of the total portfolio monetary amount is to be held as a variable annuity. Thereafter, via field 528 (which may take the form of a drop down menu), the user can select an objective for the variable annuity. In an exemplary embodiment, a variable annuity can have its own objective that is different than the overall portfolio objective.

Furthermore, via field 530 (which may take the form of a drop down menu whose options are constrained by the user-selected objective for the variable annuity), the user can select a vendor for the variable annuity.

Via section 532, the user can also select whether any niche investment products are to be eligible for inclusion in a portfolio. The niche investment products corresponds to those financial instrument products that have been classified with a "non-core" asset class. Continuing with the example of FIG. 2(*e*), of the types of niche investment products that can be selected via section 532 include aggressive income investment products, emerging markets investment products, natural resources investment products and real estate investment products. If the user does not mark any niche investments via section 532, the financial instruments classified as "non-core" are preferably not eligible for recommendation. Alternatively, if select types of niche investments are marked via section 532, the financial instruments classified as "non-core" of the selected type will be eligible for recommendation (and if recommended, will appear in the GUIs subsequently described as appropriate for the subject financial instrument's type (e.g., if the recommended niche investment is a real estate investment trust (REIT), this REIT will be displayed on the stocks GUI described hereinafter; if the recommended niche investment is a mutual fund, this niche mutual fund will be displayed on the mutual funds GUI described hereinafter)).

Thus, through GUI 500, the user can define a variety of constraints for use by software 200 when determining which financial instruments in the database 202 are to be recommended for inclusion in the subject portfolio.

Figure 6:
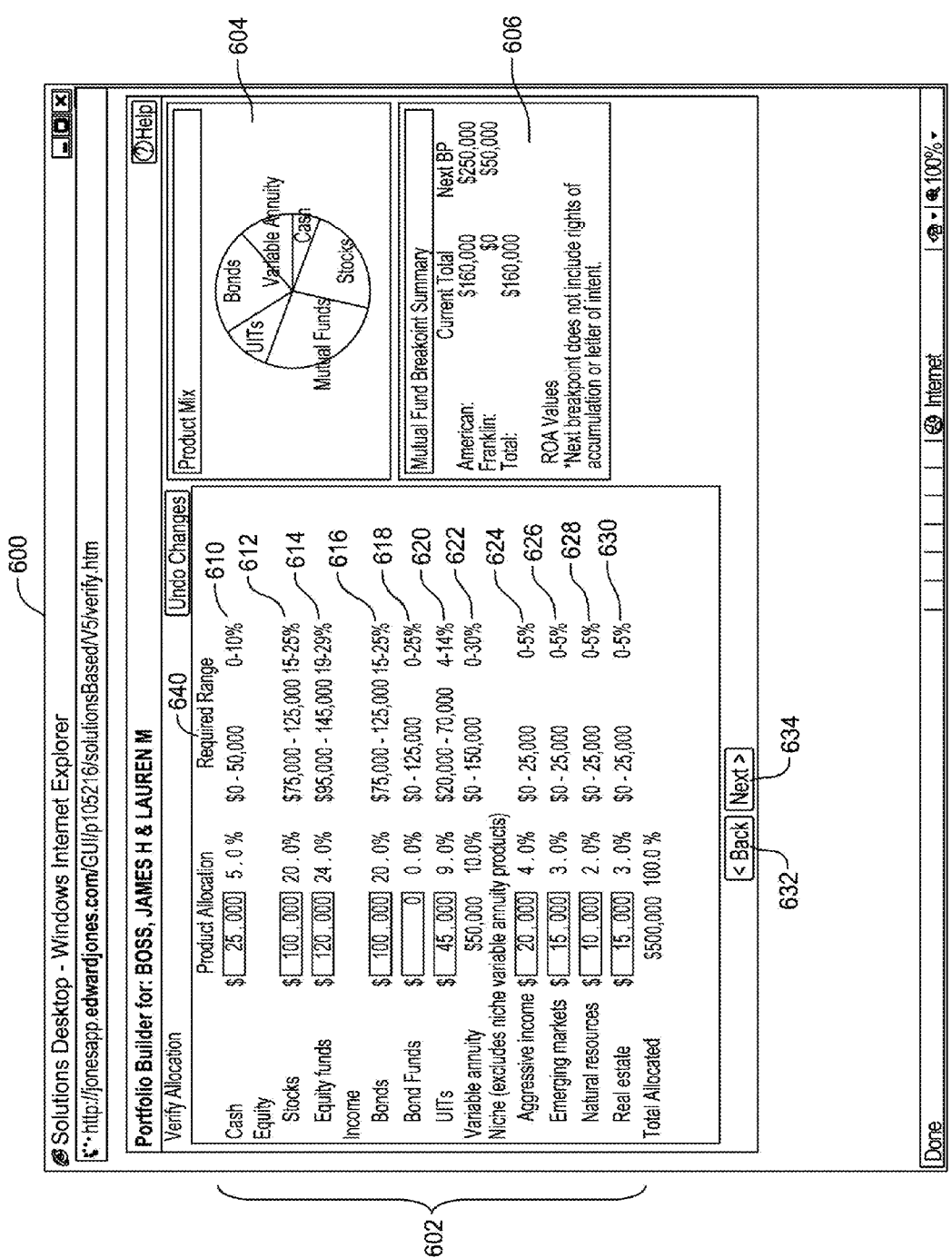
FIG. 6 depicts an exemplary page for a user to verify an allocation of financial instrument classifications for an investment portfolio.

After the user has completed data entry as appropriate in GUI 500, the user can select the "Next" button 534 to advance to the next GUI, as shown in FIG. 6.

FIG. 6 depicts an exemplary GUI 600 through which the user can verify and/or modify an allocation the portfolio monetary amount among financial instrument classifications in accordance with the portfolio objective and the constraints entered via GUI 500. Preferably, this allocation is automatically computed by the software 200 (step 302) based on the determined investment strategy in combination with the constraints defined in response to user input via GUI 500. For example, via user input in GUI 500, the user will define not only the total monetary amount for the portfolio but also (1) how much of this amount is to be held in cash, (2) how much of this amount is to be held in a variable annuity, (3) whether any money is to be invested specific types of niche investments, (4) the general type make-up of the equity classification, and (5) the general type make-up of the income classification. From these constraints, the software 200 can employ determine monetary amounts to be invested in equity products, income products and niche investment products in accordance with the determined portfolio objective. For example, a highly conservative portfolio objective may allocate a high percentage of the portfolio's total monetary amount in bonds (e.g., U.S. government bonds) relative to the amount invested in financial instruments considered more risky (e.g., stocks, emerging market investments, etc.).

Exactly how the monetary amount remaining after the user has defined the cash component and variable annuity component for the portfolio via GUI 500 is allocated among the different investment options will be a function of the particular portfolio objective. It should be understood that a practitioner will be able to devise appropriate diversification targets for various portfolio objectives that define such allocations using their wisdom and experience in the financial services industry (see FIG. 2(*c*)).

Section 602 is preferably configured to display the monetary amounts for each type of investment as determined by the software 200 in accordance with the constraints from GUI 500 under the "Product Allocation" column. Column 640, labeled "Required Range" identifies the target monetary amounts for each classification listed in section 602 as defined by the portfolio objective. Presuming the user does not enter monetary amounts in the cash and variable annuity fields 510 and 526 of GUI 500 that exceed the target ranges for the portfolio objective, the software 200 will automatically determine the monetary amounts under the "Product Allocation" column fields so that they fall within the "Required Ranges" of the portfolio objective. Should the user over-allocate or under-allocate cash and variable annuity amounts, the user can be notified of such over-allocation/under-allocation via GUI 600.

Section 610 identifies an allocation of $25,000 to cash. This section also displays that such an allocation makes up 5% of the investor's portfolio (and thus falls within the target diversification of 0%-10% for the portfolio objective).

Section 612 identifies an allocation of $100,000 to stocks. This section also displays that such an allocation makes up 20% of the investor's portfolio (and thus falls within the target diversification of 15%-25% for the portfolio objective).

Section 614 identifies an allocation of $120,000 to equity funds. This section also displays that such an allocation makes up 24% of the investor's portfolio (and thus falls within the target diversification of 19%-29% for the portfolio objective).

Section 616 identifies an allocation of $100,000 to individual bonds. This section also displays that such an allocation makes up 20% of the investor's portfolio (and thus falls within the target diversification of 15%-25% for the portfolio objective).

Section 618 identifies that no money has been allocated to bond funds (in accordance with previous user input in section 516 of GUI 500). Given that the target diversification sets a range of 0%-25% for bond funds, this allocation satisfies the portfolio objective.

Section 620 identifies an allocation of $45,000 to UITs. This section also displays that such an allocation makes up 9% of the investor's portfolio (and thus falls within the target diversification of 4%-14% for the portfolio objective).

Section 622 identifies an allocation of $50,000 to variable annuities. This section also displays that such an allocation makes up 10% of the investor's portfolio (and thus falls within the target diversification of 0%-30% for the portfolio objective).

Section 624 identifies an allocation of $20,000 to niche aggressive income products. This section also displays that such an allocation makes up 4% of the investor's portfolio (and thus falls within the target diversification of 0%-5% for the portfolio objective).

Section 626 identifies an allocation of $15,000 to niche emerging markets products. This section also displays that such an allocation makes up 3% of the investor's portfolio (and thus falls within the target diversification of 0%-5% for the portfolio objective).

Section 628 identifies an allocation of $10,000 to niche natural resources products. This section also displays that such an allocation makes up 2% of the investor's portfolio (and thus falls within the target diversification of 0%-5% for the portfolio objective).

Section 630 identifies an allocation of $15,000 to niche real estate products. This section also displays that such an allocation makes up 3% of the investor's portfolio (and thus falls within the target diversification of 0%-5% for the portfolio objective).

Section 602 further provides a sum of the investment totals below the individual displays (shown in FIG. 6 as $500,000).

Preferably, the user is free to modify the default investment amounts shown in sections 610-630 in response to user entry in the display fields that identify the default investment amounts. Furthermore, the software 200 is also configured to permit the user to modify an investment amount to a new amount that falls outside the target range for that type of investment if desired by the user. However, the software 200 is preferably configured to notify the user should a modified investment cause the investment amount for that type of investment to fall outside the target range for the determined strategy. In response to a changed investment amount, the software 200 is preferably configured to recalculate the other investment amounts in view of the determined portfolio objective (and the user-entered change).

If a user enters a change in section 602, the software 200 preferably makes the button "Undo Changes" 636 active so that section 602 can return to the default values in response to user selection of button 636.

Section 604 identifies how money is allocated within the investment portfolio with respect to various product types and subtypes. This information may be communicated via a pie chart as shown in FIG. 6, although other modes of information display may be used if desired by a practitioner. Once again, the determined portfolio objective will be applied to the user input from GUI 500 to set the default values for section 604. Moreover, preferably section 604 is updated each time the user adjusts an investment amount via section 602.

Also, section 606 of GUI 600 provides a mutual fund breakpoint summary. The user will have already selected the primary and secondary mutual funds via GUI 500, and the software will assign an investment amount to mutual funds within at least one of these families as a function of the determined portfolio objective. This assigned investment amount is reflected in the "Current Total" column of section 606 for the primary fund family (American in this example) and the secondary fund family (Franklin in this example). This "Current Total" reflects the sum of amounts recommended for investment with respect to financial instrument products classified as mutual funds (e.g., equity funds, and portions of other qualifying products). Moreover, section 606 preferably identifies a breakpoint level corresponding to each listed fund family (see the "Next BP" column). There will typically be pricing discount for mutual fund family purchases that reach certain breakpoints. By displaying how close an investor is to such a breakpoint in section 606 with respect to a fund family, the user can determine whether it would be more cost effective to modify the allocation to a mutual fund family to take advantage of the pricing difference affected by the breakpoint.

If a user wants to return to GUI 500, he/she can select the "Back" button 632. If a user is satisfied with the allocation amounts shown in GUI 600, the user can select the "Next" button 634 to advance to the GUI of FIG. 7(*a*). Once the user selects this "Next" button, the software 200 preferably executes steps 304-308. Upon determining the recommendations for inclusion in the portfolio, the user can then navigate through various GUIs corresponding to different financial instrument classification groups to review and possibly modify the recommendations, as shown in connection with FIGS. 7(*a*)-10(*c*).

Figure 7A:
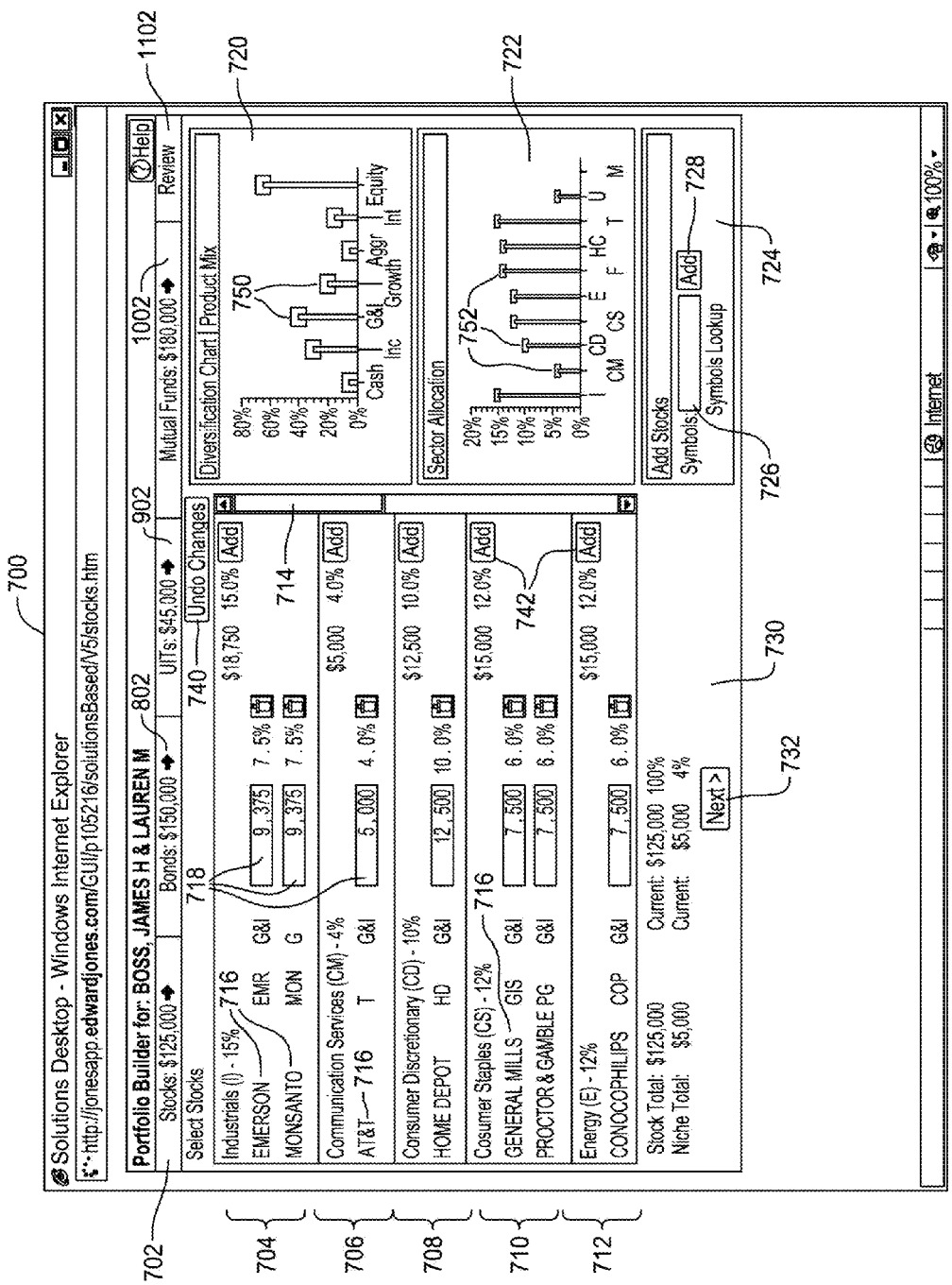
FIG. 7(a) depicts an exemplary page for populating an investment portfolio with stocks.

FIG. 7(a) depicts an exemplary GUI 700 for defining the portfolio's stock component at an individual stock level. To navigate to GUIs for other types of financial instruments, the system provides various tabs at an upper section of the GUI. In the example of FIG. 7(a), the "Stocks" tab 702 is active, but the user has the option to navigating to (1) a GUI for bonds via the "Bonds" tab 802, (2) a GUI for UITs via the "UITs" tab 902, and (3) a GUI for mutual funds via the "Mutual Funds" tab 1002. Furthermore, a "Review" tab 1102 is provided for accessing a review page, as explained below. The software 200 will determine which of these tabs (and whether any additional tabs) are displayed based on the user input in GUI 500. That is, if the user via GUI 500 specifies that no UITs are to be included in the portfolio, then the UITs tab 902 need not be displayed subsequently.

GUI 700 includes a section for identifying how much money should be invested in recommended stocks. The software will list the recommended stocks based on the retrieval operation described above from database 202 wherein the software 200 retrieves those stock financial instruments that are associated with the determined portfolio objective. In this way, a user of the system is able to efficiently leverage the research analysis by the research arm of a financial services company.

Moreover, GUI 700 preferably segregates each listed stock by its associated industry sector so that the user can assess the nature of sector diversification for the portfolio. In this example, section 704 lists recommended individual stocks within the "Industrials" sector. Section 706 lists recommended individual stocks within the "Communication Services" sector. Section 708 lists the recommended individual stocks in the "Consumer Discretionary" sector. Section 710 lists the recommended individual stocks in the "Consumer Staples" sector. Section 712 lists the recommended individual stocks in the "Energy" sector. Should the number of listed stock recommendations be large, a scroll bar 714 can be provided for use by the user to scroll down to additional stock recommendations. With each sector section, the GUI identifies each individual stock recommendation 716. For example, the "Communication Services" section 706 identifies a stock recommendation 718 for AT&T stock.

Each sector section also preferably identifies the recommended investment amount for that sector. For example, it can be seen that the recommended investment amount for the portfolio with respect to all stocks in the Industrials sector is 15% of the total individual stock allocation. This information can also be communicated as a corresponding monetary amount (e.g., $18,750 as shown for the Industrials sector). Moreover, should the user modify any of the recommended investment amounts, the software preferably updates the sector-specific percentages and investment amounts accordingly.

Each stock recommendation 716 will also include an associated recommended investment amount displayed in corresponding field 718. Preferably, the software 200 populates these fields 718 with default recommended investment amounts based on the determined portfolio objective. Optionally, these sections may also display the corresponding percentage of the portfolio that such investment amounts would make up. Should the user want to modify the investment amount relative to the default recommendation, the user can do so via data entry in the appropriate field 718. Once again, the software can be configured to permit the user to modify the investment amount to any desired amount, but the software can also be configured to notify the user if the modification will cause the investment to fall outside a target investment range for the determined investment strategy. Furthermore, the software can be configured to block any attempt to modify the investment amount to an amount that would exceed the total monetary amount for the portfolio if desired by a practitioner. It is also worth noting that the software can also be configured to permit the user to modify the recommended investment percentages rather than the investment amounts if desired. Such an option can be applied not only to the fields shown in FIG. 7(a) but to any of the fields where the user can define an investment in terms of either an amount or percentage.

Should the user modify any of the investment amounts for the stock recommendation, then the "Undo Changes" button 740 will become active. User selection of this button 740 will be effective to return the investment amounts to their default recommendations for each stock recommendation 716.

It should also be understood that the software need not constrain the user to only make stock investments for the portfolio via the stock recommendations. For example, if the user does not want to invest in a particular stock recommendation, the user can remove a stock recommendation by selecting the trash icon adjacent the subject stock recommendation shown in FIG. 7(a) (or modify the investment amount to zero for that particular stock). Furthermore, if the user wants to add other stocks to the portfolio that are not listed as recommendations, the user can do so via the "Add" buttons 742 or via the "Add Stocks" section 724.

In section 724, the GUI includes a data entry field 726 via which the user can enter a stock (preferably by typing the stock symbol for that stock). After entering a stock in field 726, the user can further select button 728 to add that stock to the list of stock recommendations for the portfolio. The software 200 will preferably be configured to add that stock into the sector section appropriate for that stock in the left portion of the GUI. Preferably, the added stock is listed in the appropriate sector section together with an associated field 718 through which the user can define how much money should be invested in the added stock. Furthermore, section 724 may include a user-selectable link labeled "Symbol Lookup" or the like to look up a stock symbol for a particular company.

To provide an alternate and/or additional technique for adding one or more stocks to the portfolio, each sector section may include an "Add" button 742 that is user-selectable to display a GUI through which the user can add stocks to the portfolio as desired. FIG. 7(b) illustrates an example of such a GUI. The GUI of FIG. 7(b) is preferably populated with stocks belonging to the sector corresponding to the area in which the selected "Add" button 742 was located. Further still, the stocks listed in the GUI as selectable options are preferably those stocks that are eligible for inclusion in the portfolio in view of the portfolio objective.

To permit the user to gauge whether the stock investments defined via GUI 700 fall within the determined investment strategy, GUI 700 also can be configured to display a diversification chart 720 and a sector allocation chart 722.

Diversification chart 720 can be configured as a bar chart where different suitability categories for financial instruments are listed on one axis (e.g., the horizontal axis) and an indicator of investment magnitude is listed on the other axis (e.g., a percentage of the total monetary amount for the portfolio). Chart 720 can also display a bar corresponding to "equity" which sums the bar magnitudes for those suitability categories that correspond to the equities asset class (e.g., the sum of the G&I, G and A bars). If the portfolio objective defines a range of recommended investment amounts for a particular financial instrument suitability category (see FIG. 2(c)), the chart 720 can include an indicator 750 to define that range in association with the bars of the bar chart.

The indicator 750 may optionally take the form of a box whose dimensions with respect to the vertical axis in the example of FIG. 7(*a*) correspond to the target investment range boundaries for the determined portfolio objective. The bar plot for the equity category on the axis can then be displayed in relation with the indicator 750 to communicate to the user whether the stock investments defined via GUI 700 fall within the desired target range for the determined portfolio objective. In the example shown in FIG. 7(*a*), it can be seen that the bar plot for equities falls within its corresponding indicator 750, thereby communicating that the stock investments are within the portfolio objective. Should the portfolio be underinvested or overinvested in stocks relative to the portfolio objective (or for any financial instrument classification for that matter), the software may optionally display the indicator 750 for equities with a changed color to better communicate the out-of-strategy status.

The sector allocation chart 722 can operate in a similar fashion to the diversification chart 720, albeit where the bar plots are specific to stock investments in particular industry sectors. Thus, one axis (e.g., the horizontal axis as in FIG. 7(*a*)) can segregate stock investments by industry sector while the other axis (e.g., the vertical axis as in FIG. 7(*a*)) can indicate the investment magnitude for each industry sector for the portfolio's stock investments. In the example of FIG. 7(*a*), the investment magnitude is displayed as a percentage of the total monetary amount of stock investments for the portfolio.

Sector allocation chart 722 can also include an indicator 752 to define a target range for investment in a particular sector as per the determined portfolio objective in association with the bars of the bar chart. This indicator 752 may be configured as a box similarly to indicator 750. In this way, the user can quickly determine whether the portfolio is underinvested or overinvested in a particular industrial sector by checking to see whether the sector's bar plot falls inside the associated indicator 752.

It should also be noted that GUI 700 may include a section 730 that summarizes the stock investments defined via the GUI. The left portion of section 730 can list a "Stock Total" that identifies the amount of monetary investments in stocks that are recommended as per the portfolio objective. Below this listing, section 730 may further list how much of this total is to be made up of "niche" investments. To the right, section 730 can list the current amounts for stock investments that have been defined via the GUI 700, both with respect to the total sum and the "niche" subcomponent. Thus, section 730 provides another mechanism by which the user can assess whether the portfolio is staying consistent with the portfolio objective. Further still, should the user's modification(s) to the stock allocations via GUI 700 cause the portfolio to fall outside the target allocation for stocks as per the portfolio objective, the software can notify the user of this situation via a message in section 730.

Should the user complete defining the portfolio's stock investments via the GUI of FIG. 7(*a*), the user can select the "Next" button 732 to proceed to the next GUI in the portfolio building process.

Figure 8:
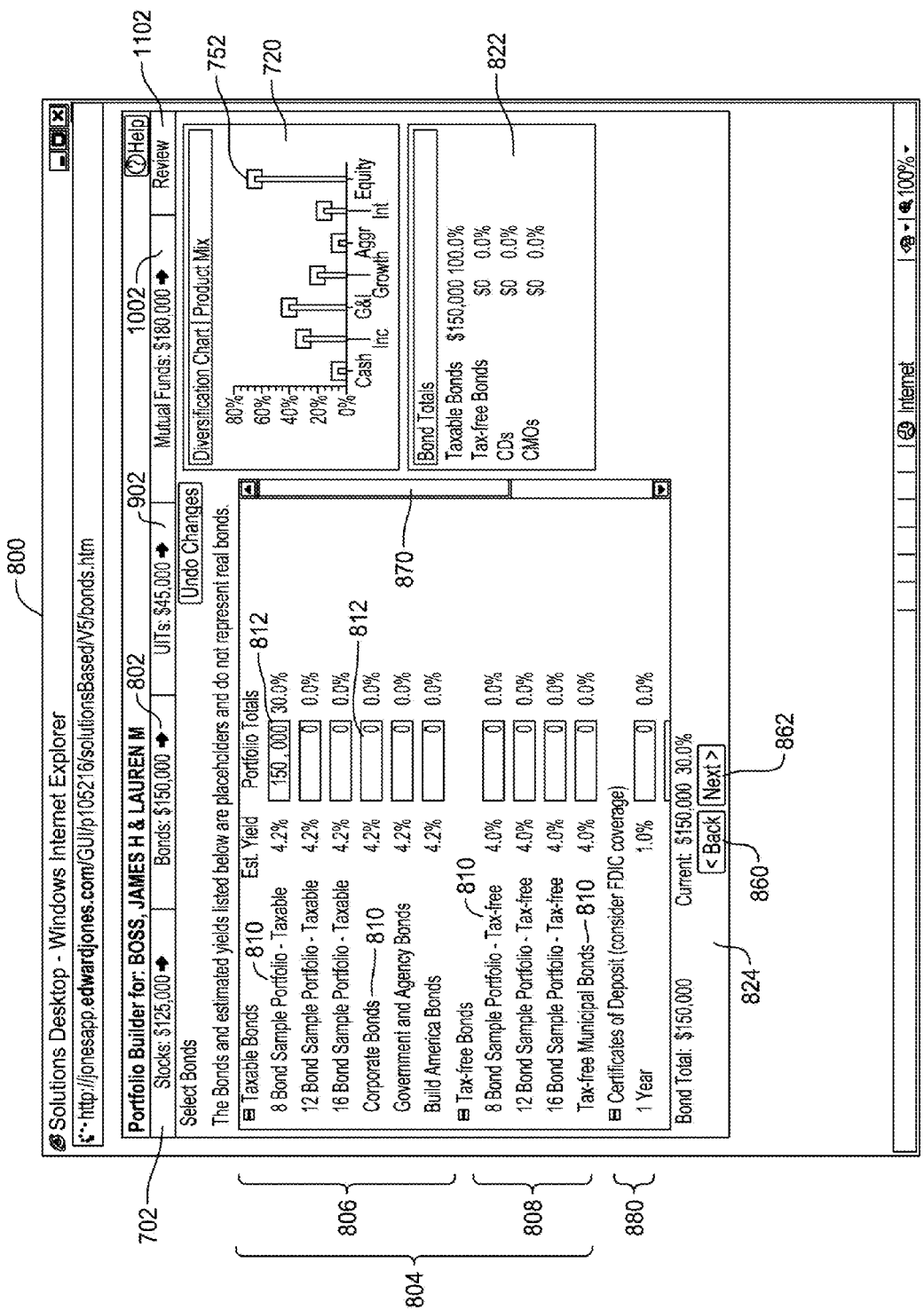
FIG. 8 depicts an exemplary page for populating an investment portfolio with income products.

FIG. 8 depicts an exemplary GUI 800 for defining the portfolio's income products component at an individual product level (e.g., bonds). GUI 800 includes a section 804 for identifying how much money should be invested in recommended income products. The software will list the recommended income products based on the retrieval operation described above from database 202 in accordance with the portfolio objective and any constraints entered by the user via GUI 500. In this way, a user of the system is able to efficiently leverage the research analysis by the research arm of a financial services company.

Moreover, GUI 800 preferably segregates each listed income product 810 by its taxable or tax-free status via sections 806 and 808 respectively. GUI 800 may further segregate income investments corresponding to Certificates of Deposit (CDs) in section 880 and income investments corresponding to Collateralized Mortgage Obligations (CMOs) in another section (not shown). It should be understood that each listed income product recommendation 810 may correspond to types of income products such as individual bonds or individual bond funds and the like (see section 516 of FIGS. 5(*a*)-(*b*)). Should the number of listed income product recommendations be large, a scroll bar 870 can be provided for use by the user to scroll down to additional income product recommendations.

With each income product recommendation 810, section 804 includes a field (see column 816) that identifies an estimated yield for the subject income product 810 and a field 812 that identifies a recommended investment amount for the subject income product 810. This field can display the recommended investment amount in terms of a monetary amount for investment (e.g., $150,000 as shown for the first recommendation) and/or in terms of a percentage of the total portfolio that the individual investment would constitute. By default, the software 200 preferably automatically populates field 812 with an amount defined by the determined portfolio objective. However, the software 200 also preferably provides the user with an ability to modify the investment amounts shown in field 812. Such modification could be carried out via data entry in field 812 to modify the investment total and/or modify the allocated percentage.

GUI 800 may also include the diversification chart 720 as described in connection with FIG. 7(*a*). The bar chart corresponding to the "income" financial instrument category can be updated based on any user input in section 804.

Furthermore, GUI 800 may further include a totals section 822 that summarizes the investment totals for each of taxable bond investments, tax-free bond investments, CD investments and CMO investments made via section 804. These totals can be expressed in terms of both monetary amounts and as percentages of overall investments in income financial instruments for the portfolio.

Section 824 can display a similar summary but including a comparison between the current investment amount in income products for the portfolio (right side) and the target investment amount in income products for the portfolio as per the portfolio objective (left side). If the current amount falls outside the target amount, the software can so notify the user in section 824.

Should the user want to return to the stocks GUI 700, the user can do so via selection of the "Back" button 860 (or the "Stocks" tab 702). Moreover, once the user completes defining the portfolio's income products investments via the GUI of FIG. 8, the user can select the "Next" button 862 to proceed to the next GUI in the portfolio building process.

Figure 9A:
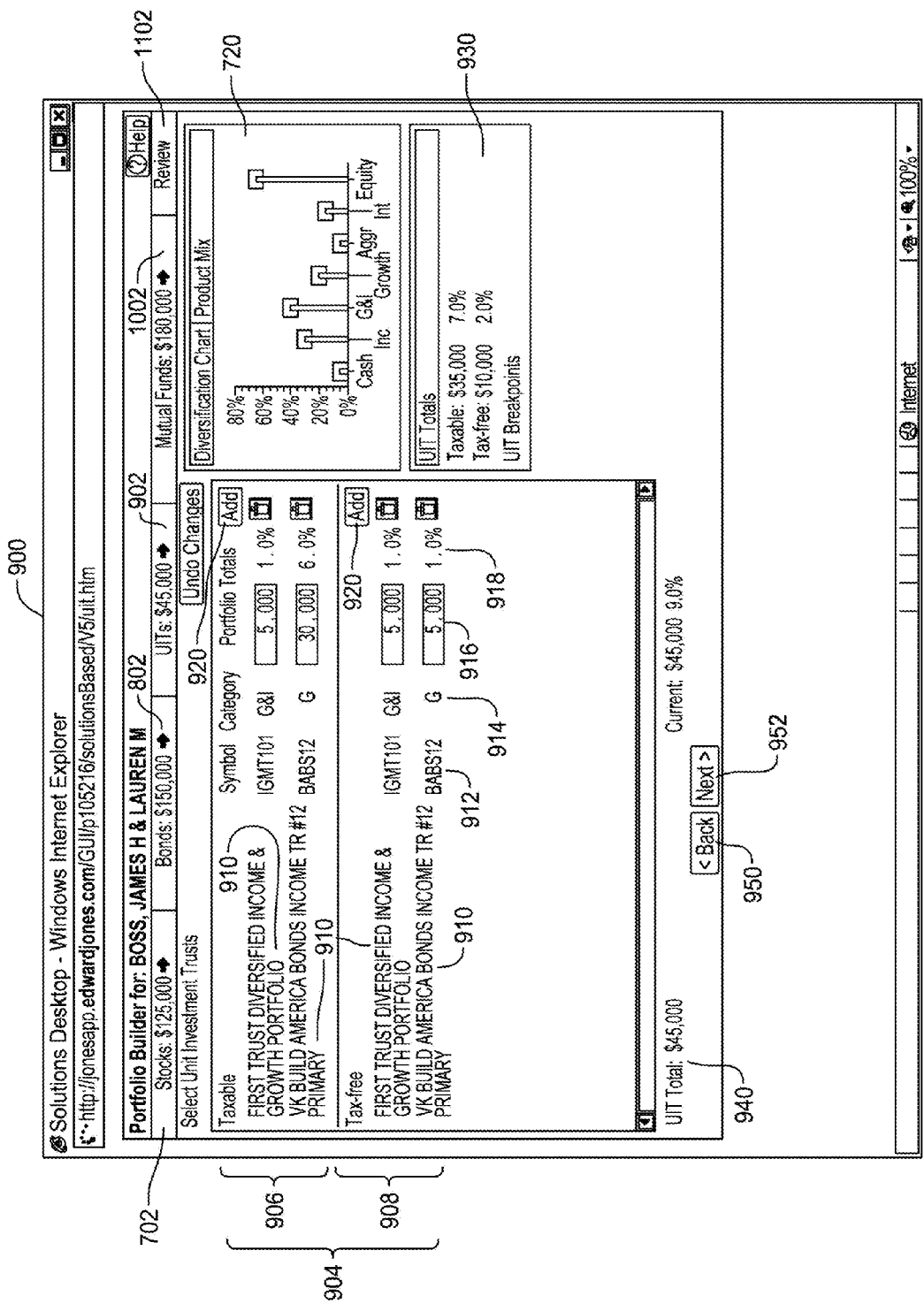
FIG. 9(a) depicts an exemplary page for populating an investment portfolio with unit investment trusts.
Figure 10A:
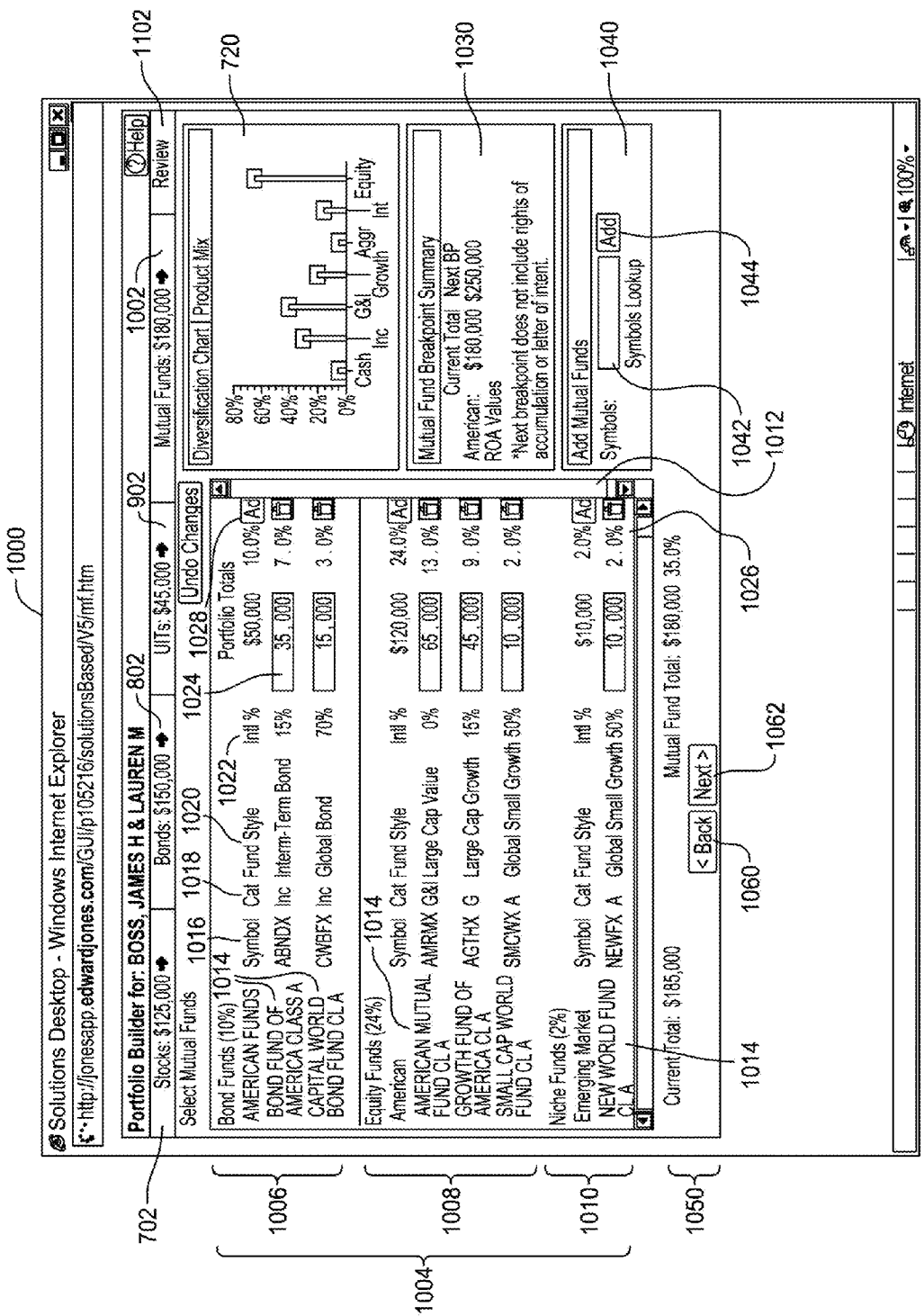
FIG. 10(a) depicts an exemplary page for populating an investment portfolio with mutual funds.

FIG. 9(*a*) depicts an exemplary GUI 900 for defining the portfolio's UIT component at an individual investment level. GUI 900 includes a section 904 for identifying how much money should be invested in recommended UITs. The software will list the recommended UITs based on the retrieval operation described above from database 202 wherein the software 200 retrieves those UIT financial instruments that are associated with the determined portfolio objective. Once again, such an exemplary embodiment permits a user of the system is able to efficiently leverage the research analysis by the research arm of a financial services company.

Moreover, GUI 900 preferably segregates each listed UIT 910 by its taxable or tax-free status via sections 904 and 906 respectively. Should the number of listed UIT recommendations be large, a scroll bar (not shown) can be provided for use by the user to scroll down to additional UIT recommendations.

With each UIT recommendation 910, section 904 includes a field (see column 912) that identifies a symbol for the subject UIT and a field 914 that identifies a suitability category for the recommended UIT (see FIG. 2(*f*)). Moreover, the field defined by column 916 identifies a recommended investment amount for the subject UIT 910. This field can display the recommended investment amount in terms of a monetary amount for investment (e.g., $30,000 as shown for the second UIT recommendation) and/or in terms of a percentage of the total portfolio that the individual UIT investment would constitute. By default, the software 200 preferably automatically populates field 916 with an amount defined by the determined portfolio objective. However, the software 200 also preferably provides the user with an ability to modify the investment amounts shown in field 916. Such modification could be carried out via data entry in field 916 to modify the investment total and/or modify the allocated percentage. Optionally, modifications to investment amounts could also or alternatively be made by changing the percentage listing shown in field 918.

Should the user want to add one or more UITs to section 904 as options for investment, the user can select the "Add" buttons 920 to do so, for both taxable and tax-free UITs. Upon selection of an "Add" button 920, a popup window (see FIG. 9(*b*)) that lists eligible taxable or tax-free UITs (depending on which "Add" button is selected) for user selection of individual UITs to add to the portfolio.

GUI 900 may also include the diversification chart 720 as described in connection with FIG. 7(*a*). The bar charts corresponding to the "G&I" (growth and income) and "Growth" financial instrument categories can be updated based on any user input in section 904 with respect to UITs categorized as G&I or G (growth).

Furthermore, GUI 900 may further include a totals section 930 that summarizes the investment totals for each of taxable UIT investments and tax-free UIT investments made via section 904. These totals can be expressed in terms of both monetary amounts and as percentages of overall investments with respect to the portfolio as a whole. If desired, this section can also include a breakpoint analysis for the UIT investments similar to the mutual fund family previously described in connection with FIG. 6.

Section 940 can display a similar summary but including a comparison between the current investment amount in UITs for the portfolio (right side) and the target investment amount in UITs for the portfolio as per the portfolio objective (left side). Once again, should user modifications cause the current investment amount to fall outside the target investment amount (or range), the software can so notify the user in section 940. Furthermore, the software can be configured to prevent the "Next" button 862 from being actionable until the user has adjusted the current investment amount to fit within the target investment amount. Similar limiting actions on the "Next" button can be employed on the other GUIs of FIGS. 7(*a*), 8 and 10(*a*).

Should the user want to return to the "Bonds" GUI 800, the user can do so via selection of the "Back" button 950 (or the "Bonds" tab 802). Moreover, once the user completes defining the portfolio's UIT investments via the GUI of FIG. 9(*a*), the user can select the "Next" button 952 to proceed to the next GUI in the portfolio building process.

FIG. 10(*a*) depicts an exemplary GUI 1000 for defining the portfolio's mutual funds component at an individual investment level. GUI 1000 includes a section 1004 for identifying how much money should be invested in recommended mutual funds. The software will list the recommended mutual funds based on the retrieval operation described above from database 202 wherein the software 200 retrieves those mutual fund financial instruments that are associated with the determined portfolio objective. Once again, such an exemplary embodiment permits a user of the system to efficiently leverage the research analysis by the research arm of a financial services company.

Moreover, GUI 1000 preferably segregates each listed mutual fund 1014 by its classification as a bond fund, an equity fund, a niche fund, and others via sections 1006, 1008, and 1010 respectively. Should the number of listed mutual fund recommendations be large, a scroll bar 1012 can be provided for use by the user to scroll down to additional mutual fund recommendations.

With each mutual fund recommendation 1014, section 1004 includes a field (see column 1016) that identifies a symbol for the subject mutual fund and a field 1018 that identifies a suitability category for the recommended mutual fund (e.g., whether the mutual fund corresponds to an income financial instrument product, a "growth and income" (G&I) financial instrument product, a "growth" financial instrument product, an "aggressive" financial instrument product, etc. (see FIG. 2(*f*)). The field defined by column 1020 identifies a style for the mutual fund (e.g., intermediate term bond mutual funds, global bond mutual funds, large capitalization value mutual funds, large capitalization growth mutual funds, global small growth mutual funds, etc.) The portfolio balancing algorithm employed by software 200 can optionally take fund style into consideration when selecting mutual funds from among eligible mutual funds for inclusion in the portfolio recommendation. The field defined by column 1022 identifies a percentage of the subject mutual fund corresponding to its international exposure. Database tables for the mutual funds can store the style and international exposure information in association with each mutual fund. Moreover, the field defined by column 1024 identifies a recommended investment amount for the subject mutual fund 1014. This field can display the recommended investment amount in terms of a monetary amount for investment (e.g., $35,000 as shown for the first mutual fund recommendation) and/or in terms of a percentage of the total portfolio that the individual mutual fund investment would constitute. By default, the software 200 preferably automatically populates field 1024 with an amount defined by the determined portfolio objective. However, the software 200 also preferably provides the user with an ability to modify the investment amounts shown in field 1024. Such modification could be carried out via data entry in field 1024 to modify the investment total and/or modify the allocated percentage. Optionally, modifications to investment amounts could also or alternatively be made by changing the percentage listing shown in percentage field 1026.

Should the user want to add other mutual funds to the portfolio that are not listed as recommendations, the user can do so via the "Add" buttons 1028 or via the "Add Mutual Funds" section 1040.

In section 1040, the GUI includes a data entry field 1042 via which the user can enter a mutual fund (preferably by typing the symbol for that mutual fund). After entering a mutual fund in field 1040, the user can further select button 1044 to add that mutual fund to the list of mutual fund recommendations in section 1004. The software 200 will preferably be configured to add that mutual fund into the section appropriate for that mutual fund in the left portion of the GUI. Preferably, the added mutual fund is listed in the appropriate sector section together with an associated fields described above, including field 1024 through which the user can define how much money should be invested in the added mutual fund. Furthermore, section 1040 may include a user-selectable link labeled "Symbol Lookup" or the like to look up a mutual fund symbol for a particular mutual fund.

To provide an alternate and/or additional technique for adding one or more mutual funds to the portfolio, each section 1006, 1008, etc. within section 1004 may include an "Add" button 1028 that is user-selectable to display a GUI through which the user can add mutual funds corresponding to a particular classification (e.g., bond funds, equity funds, niche funds) to the portfolio as desired. FIG. 10(b) illustrates an exemplary GUI that would be displayed in response to user selection of an "Add" button 1028 in section 1008 for equity funds. FIG. 10(c) illustrates an exemplary GUI that would be displayed in response to user selection of an "Add" button 1028 in section 1010 for niche funds. These GUIs are preferably populated with eligible fund options corresponding to their respective classifications as determined by the portfolio objective.

GUI 1000 may also include the diversification chart 720 as described in connection with FIG. 7(a). The bar charts for the different financial instrument categories can be updated based on any user input in section 1004 with respect to mutual funds falling into those respective categories (see column 1018).

Furthermore, GUI 1000 may further include a mutual fund breakpoint summary section 1030 that provides a breakpoint analysis of the mutual fund recommendation, as described above.

Section 1050 can display a mutual fund investment summary that includes a comparative display between the current investment amount in mutual funds for the portfolio as modified by any user input in section 1004 (right side—which shows a current mutual fund amount of $185,000) and the recommended target investment amount in mutual funds for the portfolio as per the portfolio objective (left side—which shows a mutual fund amount of $180,000). This indicates that the user should subtract $5,000 from the mutual fund allocation to fit within the portfolio objective. Optionally, the software can add a message to section 1050 that specifically identifies this need. Furthermore, the software may render the "Next" button 1062 inactive until the user brings the current mutual fund allocation in line with the target.

Should the user want to return to the "UITs" GUI 900, the user can do so via selection of the "Back" button 1060 (or the "UITs" tab 902). Moreover, once the user completes defining the portfolio's mutual fund investments via the GUI of FIG. 10(a), the user can select the "Next" button 1062 to proceed to the next GUI in the portfolio building process.

Figure 11:
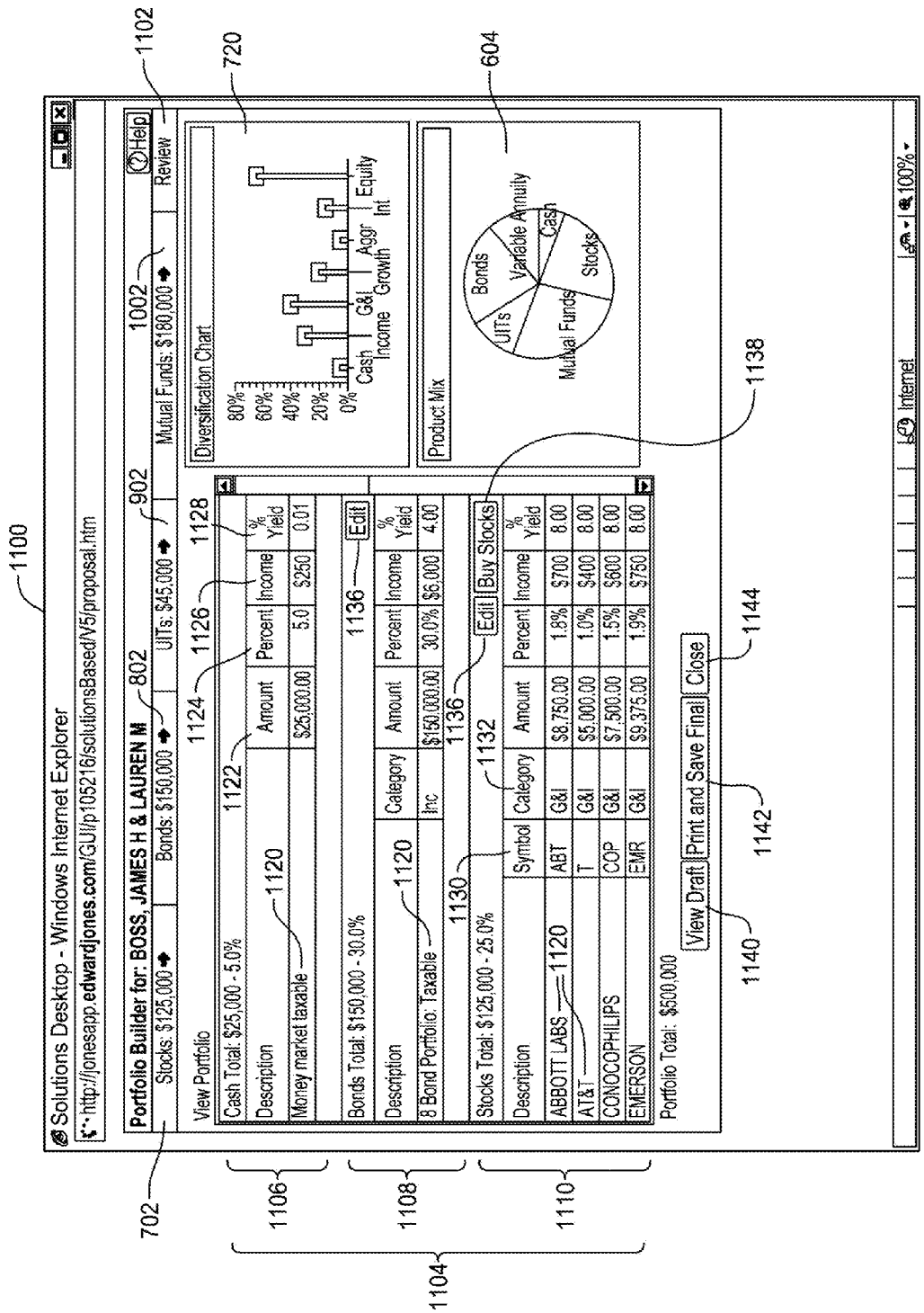
FIG. 11 depicts an exemplary page for reviewing a populated investment portfolio.

Once the user has defined the desired investments via GUIs 700, 800, 900 and 1000, the user can review the so-defined portfolio via the GUI 1100 of FIG. 11. This GUI 1100 can be reached in response to user selection of the "Review" tab 1102 or user selection of the "Next" button 1062 from GUI 1000. GUI 1000 provides the user with a summary via section 1104 of the defined portfolio.

Section 1104 includes a number of different sections as shown in the exemplary embodiment of FIG. 11. For example, section 1106 summarizes the cash component of the portfolio. Section 1108 summarizes the income component of the portfolio. Section 1100 summarizes the stocks component of the portfolio. Other sections (not shown) can be provided that summarize the UITs component, mutual funds component and variable annuity components of the portfolio. A scroll bar can be used to adjust the display to show these other sections.

Each section preferably lists the individual financial instrument components 1120 of the portfolio, together with fields that identify each instrument's investment amount (column 1122), the percentage of the investment amount relative to the total portfolio investment amount (column 1124), expected yearly income (column 1126), and expected annual yield (column 1128). Stocks that are listed in section 1110 may also include fields that identify the stock symbol (field 1130) and stock category (field 1132).

"Edit" buttons 1136 can be included in these section (see, e.g., section 1108 and 1110 as shown in FIG. 11) for user selection to return to the appropriate GUI for defining individual investments of a particular type. For example, user selection of the "Edit" button 1136 within the "Bonds" section 1108 can be effective to return the user to GUI 800 of FIG. 8.

Moreover, the section 1110 may include a "Buy Stocks" button 1138 that is user selectable to communicate the stock recommendations to an order system that is in communication with the processor 102. The order system can then submit automated purchase orders for the stock recommendations to an exchange or the like to thereby purchase the stocks for the investor. In doing so, the user can avoid the need to re-key stock information when making purchases in accordance with the portfolio recommendation on behalf of the investor. Similar functionality can be provided with respect to mutual fund and bond purchases if desired.

GUI 1100 may also include the diversification chart 720 as described in connection with FIG. 7(a) and a product mix chart 604 as described in connection with FIG. 6 to thereby provide the user with a convenient visual summary of the nature of investments for the portfolio.

If the user wants to view a printable draft of the portfolio, the user can select the "View Draft" button 1140. In response to the selection of this button 1140, an exemplary report such as the one shown in FIGS. 12(a) and (b) can be displayed and printed. As can be seen, this report provides an organized breakdown of the components of the so-defined portfolio. Preferably, such a report identifies the investor for whom the portfolio was created ("John Smith" in this example) as well as the user who created the portfolio (e.g., the financial advisor "Ted Jones") and the date on which the report was created.

Figure 12A:
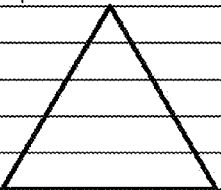
FIGS. 12(a) and (b) depict an exemplary portfolio proposal report that can be generated from the exemplary software application described in connection with FIGS. 4-11.

From GUI 1100, if the user is satisfied with the defined portfolio, the user can select the "Print and Save Final" button 1142 to cause a report such as the one shown in FIGS. 12(a)-(b) to be created and printed and save the portfolio to the database 202 in a manner that identifies the portfolio as being presented to the investor, thereby creating an audit trail. Further still, this database record further stores a copy of the report as created for auditing purposes. Alternatively, the user can choose to simply close the portfolio building application in response to selection of the "Close" button 1144, in which case the portfolio is simply saved as a work-in-progress.

Thus, the exemplary GUIs of FIGS. 4-11 illustrate how a user can efficiently build an investment portfolio to accommodate an investor's portfolio objective while leveraging pre-existing research with respect to various financial instruments available for investment.

Figure 13:
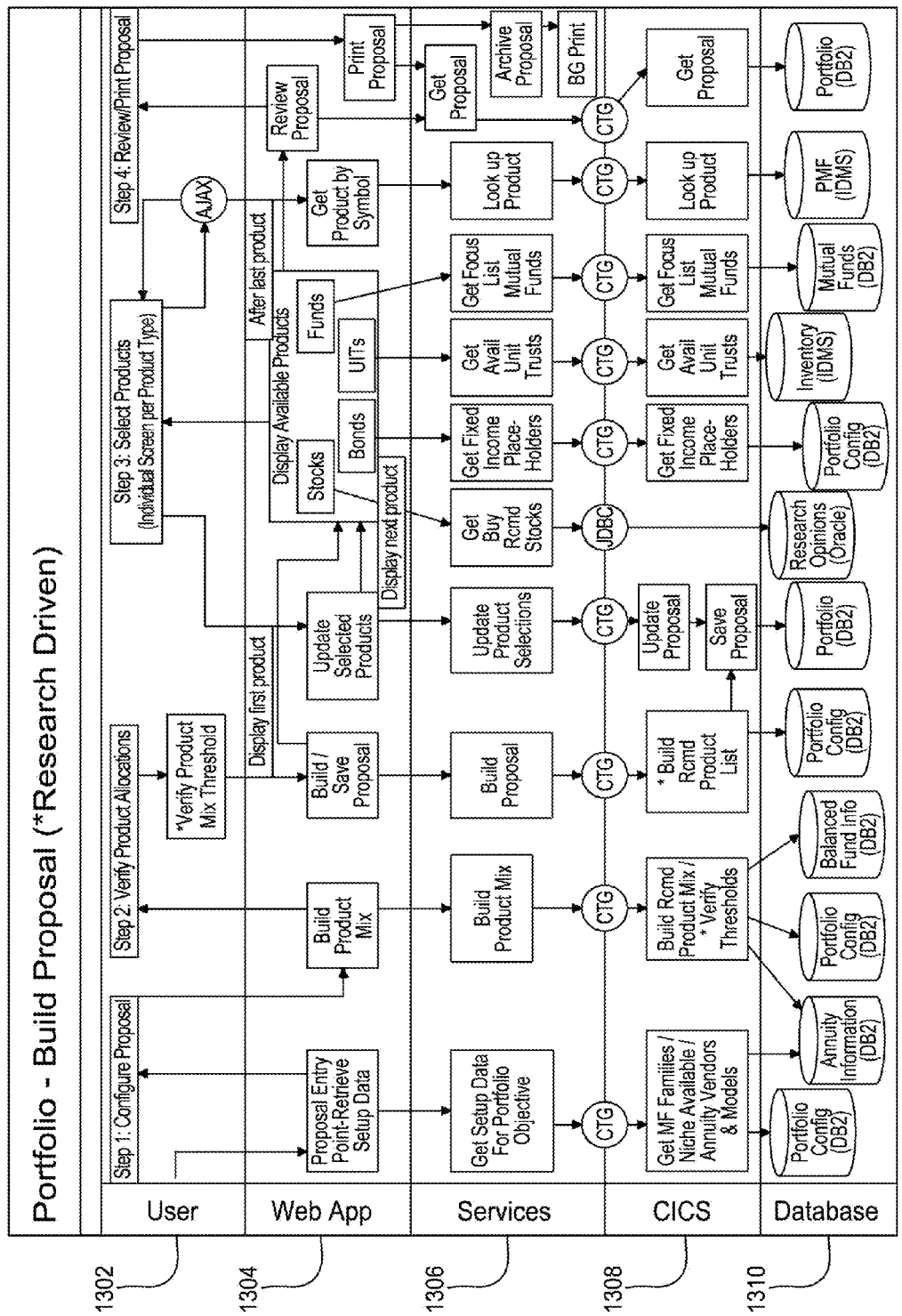
FIG. 13 depicts an exemplary process flow for a portfolio building software application deployed in a particular server environment.

FIG. 13 depicts an exemplary system diagram that illustrates how various process flows can be distributed across computing resources. FIG. 13 shows an exemplary distribution at the user level 1302, web application level 1304, services level 1306, a transaction server level 1308 (e.g., a Customer Information Control Systems (CICS) transaction server) and a database level 1310.

In the example of FIG. 13, it can be seen that the database 202 is shown at level 1310 as several different data sets pertaining to particular data sets of interest. As indicated above, these different data sets can also be housed in the same physical device or distributed across multiple physical devices.

The operations shown at the user level 1302 of FIG. 13 correspond to the GUI level display operations for the Portfolio Builder application, as exemplified by FIGS. 4-11, Step 1 generally corresponds to FIGS. 4, 5(*a*) and (*b*). Step 2 generally corresponds to FIG. 6. Step 3 generally corresponds to FIGS. 7(*a*)-10(*c*). Step 4 generally corresponds to FIG. 11.

The tasks performed at the web application level 1304 operate to accept user input from the GUIs, call appropriate services to retrieve or update data, and produce screen outputs for display on the GUIs for the next operation.

The tasks performed at the services level 1306 operate to provide an abstraction layer for the web application layer with respect to certain business functions. In the event that a practitioner wants to change the front end experience for the user, this different front end (at the web application tier) can utilize the "services" layer 1306 to retrieve data and provide a different front end experience for the user without necessitating lower level changes in the system. The web application level provides interactions with the end user browser application to build screens and process user input. The services level provides a business service tier for retrieving or updating data along with applying business rules for the application. As explained below, the CICS level is an extension of the services level for performing data access against mainframe data sources.

At the transaction server level 1308, a CICS transaction server or the like, acting through an interface such as a CICS Transaction Gateway (CTG), accesses the pertinent data sets in database 202 of the database level 1310 to read and write to the database 202 as appropriate. For example, as updates are made to the portfolio, these updates can be stored in the database. Moreover, the transaction server level 1308 can query the database 202 to obtain the information that is to be used by the software in levels 1302, 1304, 1306 and 1308 to populate the GUIs (for example, lists of recommended financial instruments, recommended investment amounts, etc.). In a preferred embodiment, the software that implements the balancing algorithm for automatically determining which financial instrument products are recommended for inclusion in a portfolio based on a portfolio objective is preferably executed at the transaction server level 1308.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof. It should further be understood that the embodiments disclosed herein include any and all combinations of features as disclosed herein and/or described in any of the dependent claims.

APPENDIX

Exemplary Stock Selection Algorithm

The balancing algorithm preferably allocates individual stocks as a final step in the allocation process. Thus, the stock selection algorithm is designed to be flexible to allow the portfolio to fall within the appropriate investment suitability recommendations, international weights, and sector weights for the portfolio objective. As noted above, research analysts preferably tag stocks in database 202 with data indicative of whether a particular stock is eligible for inclusion in a portfolio (e.g., field 226 of FIG. 2(*b*)).

One aspect of the stock selection algorithm is determining a target number of stocks to include in the portfolio. This target number of stocks for each portfolio can be determined by two factors: the percentage of stocks in the portfolio and the total dollar amount invested in stocks as shown in the table below. The number of stocks in the portfolio is preferably based on a sliding scale with the lower the percentage of the stocks in the portfolio and the lower total dollar amount allocated to equities leading to a lower number of stocks. As the total amount in stocks gets larger either in dollar terms or percentage terms, the portfolio is allocated with a larger number of stocks. For example, in a preferred embodiment, individual equities are not allowed in portfolios unless the dollar amount allocated to stocks is at least $50,000. In many cases, at least 20 stocks will be placed in portfolios to allow for maximum diversification (with 12 stocks being an exemplary minimum to allow for proper sector diversification in such an embodiment). The actual number of stocks in the portfolio may vary depending on the needs of the portfolio.

| Summary - Target Number of Stocks | | | |
|---|---|---|---|
| | Amount Invested in Stocks | | |
| Stock/Portfolio | $50,000 $200,000 | $200,000 $400,000 | $400,000 $10,000,000 |
| 0% | 12 | 20 | 25 |
| 10% | 12 | 20 | 25 |
| 20% | 17 | 20 | 25 |
| 30% | 20 | 25 | 30 |
| 40% | 25 | 30 | 30 |
| 50% | 25 | 30 | 35 |
| 60% | 30 | 35 | 35 |
| 70% | 35 | 35 | 40 |
| 80% | 40 | 35 | 40 |
| 90% | 40 | 40 | 40 |

A target dollar amount per sector is determined by multiplying the recommended sector weight by the total dollar amount of stocks in the portfolio. The algorithm will aim to exactly hit the sector weight so the recommended stock holdings will align with the sector allocation chart 722 (see FIG. 7(*a*)).

The target dollar amount per stock is determined by multiplying the target percentage per stock by the value of the portfolio. The target percentage per stock is determined by the percentage of the portfolio that stocks are to make up as per the portfolio objective in view of previous allocations made by the algorithm. To hit the sector weights and also stay within desired guidelines, the target dollar amount per stock can be adjusted within a minimum and maximum range. In addition, if any dollar amount is below $2,000, it is preferably moved to $2,000, which the algorithm can employ as the minimum amount per stock. After the algorithm makes its initial stock selections, a check is run to determine if sector and suitability targets are met. If not, there is a second adjustment process that adjusts stock amounts higher by 20% or lower by 25% to better hit the sector and suitability targets. After these adjustments, the logic looks back at the stock selections and their dollar amounts to see if any stock is above a system-defined maximum amount per stock. If so, the algorithm then tries to split the stock with the next stock from that sector and suitability in the accordance with the build order.

The algorithm next looks at all the prior stock selections and determines how much is still needed to hit the mid-point of each suitability category. The algorithm then sums all percentages needed to hit the mid-point (example: 2% aggressive still needed, 15% in growth still needed, and 22% in growth and income still needed for a total of 39%). To then determine the dollar amount needed in each suitability category, the tool divides each suitability category by the total and multiplies this by the dollar amount allocated to stocks. (example: Aggressive: 2%/39%=5.1%×$100,000=$5,100 needed in aggressive suitability).

Research analysts can be responsible for providing sector build orders for each portfolio objective by sector and by suitability and updating the database to reflect this information. In an exemplary embodiment, there are four separate build orders: 1. All Equity/Growth; 2. Balanced Toward Growth; 3. Balance Growth and Income; and 4. Balanced Toward Income/Income Focus.

A build order by suitability for each of the four portfolios can also be established by research analysts. The build orders are based on assumptions of how many stocks from each sector will be in each portfolio (example: Technology should get 4 or 5 in the Growth portfolio but Communications will only get 1). The build orders are designed to provide appropriate sub-sector diversification and the order of recommendations is varied by portfolio objective to minimize concentration risk.

The recommendation portion of the stock selection algorithm is designed to be flexible to allow the portfolio to meet its three stated objectives: 1. stay in alignment with investment suitability guidelines; 2. stay in alignment with international guidelines; and 3. make each sector weight align with the recommended sector allocation. To accomplish this, the algorithm employs has logic to add stocks to the portfolio from each sector and suitability category based on the defined build orders.

To begin this aspect of the process, the algorithm determines how much the portfolio still needs in each suitability category and in each sector as detailed above. Once these amounts are determined, the algorithm looks to each sector build order to begin adding stocks to the portfolio. The tool preferably circles through the suitability build orders in the following order: Aggressive, Growth and Income, then Growth. The tool preferably circles through sector build orders in the following order:
Communications
Utilities
Consumer Staples
Energy
Health Care
Financial Services
Industrials
Consumer Discretionary
Technology The order is based on sectors with the highest to lowest Growth and Income offerings in a normalized environment knowing the algorithm likely needs a greater than average amount of Growth and Income. Knowing the algorithm will likely cycle through each sector more than once, this order allows Growth and Income heavy sectors like Consumer Staples and Energy to contribute more than one Growth and Income stock, leaving room for more Growth intensive sectors like Industrials and Technology to likely add more than one Growth stock. Once a sector has already reached its allocated sector weight, that sector is skipped as the tool cycles through the build orders looking for additional stocks. Once all stocks are selected, the algorithm has logic in place to look at all the stock dollar amounts and slightly adjust dollar amounts where appropriate to better hit sector and suitability allocations.

The last step in the stock logic is a check to ensure the international weight of the portfolio is within portfolio objective guidelines. If the portfolio is above or below the international range, the algorithm looks at each suitability category by sector in reverse order from the initial build order logic (starting with Technology and ending with Communications Services). if underweight with respect to international, the algorithm tries to replace a domestic stock in the same sector and suitability category with an international stock. If overweight with respect to international, the algorithm tries to replace an international stock with a domestic stock from the same sector and suitability category. By moving money only between stocks in the same sector and suitability category, the only variable that changes is the international mix.

What is claimed is:

1. A system for building a recommended investment portfolio, the system comprising:
a memory configured to store a plurality of data structures, each data structure corresponding to a financial instrument product and being associated with (1) at least one of a plurality of financial instrument classifications and (2) at least one of a plurality of portfolio objectives, wherein the plurality of data structures are associated in the aggregate with a plurality of different financial instrument classifications and a plurality of different portfolio objectives;
a processor in communication with the memory, the processor configured to (1) determine a portfolio objective for an investor in response to user input, (2) interact with the memory by processing at least a plurality of the stored data structures based at least in part on their associations with the determined portfolio objective to determine a plurality of financial instrument products for recommendation for inclusion in the portfolio, the plurality of financial instrument products for recommendation corresponding to a plurality of financial instrument classifications and being associated with the determined portfolio objective, and (3) determine an investment amount for each determined financial instrument product for recommendation based at least in part on the determined portfolio objective.

2. The system of claim 1 wherein the processor is further configured to, for each of a plurality of financial instrument classifications, provide a graphical user interface (GUI) corresponding to that financial instrument classification for display to a user, wherein that GUI is configured to display (i) data that identifies each determined financial instrument product for recommendation that is associated with that financial instrument classification and (ii) the determined investment amount for each displayed financial instrument product for recommendation that is associated with that financial instrument classification.

3. The system of claim 2 wherein the data structures comprise a suitability category field that is indicative of whether the corresponding financial instrument product is recommended according to a particular category of investment, and wherein the data structures are indirectly associated in the memory with the at least one portfolio objective based on the suitability category field.

4. The system of claim 3 wherein the memory is further configured to store a plurality of portfolio objective data structures, each portfolio objective data structure being associated with a portfolio objective and defining a plurality of target allocations with respect to a plurality of different financial instrument classifications, and wherein the processor is further configured to (1) retrieve the portfolio objective data structure associated with the determined portfolio objective, and (2) determine the financial instrument products for recommendation based on the target allocations defined by the retrieved portfolio objective data structure.

5. The system of claim 2 wherein the processor is further configured to (1) receive input through any of the GUIs corresponding to the financial instrument classifications to modify the portfolio, (2) determine whether the portfolio modification causes the portfolio to fall outside a threshold defined by the determined portfolio objective, and (3) notify a user through a GUI in response to a determination being made that the portfolio modification causes the portfolio to fall outside the threshold.

6. The system of claim 5 wherein the plurality of financial instrument classifications comprise stocks, bonds and mutual funds.

7. The system of claim 6 wherein the plurality of financial instrument classifications further comprise unit investment trusts (UITs).

8. The system of claim 6 wherein the data structures corresponding to stocks are further associated with an industry sector such that the memory stores data structures corresponding to stocks of a plurality of industry sectors, and wherein the processor is further configured to select stocks for recommendation for inclusion in the portfolio based at least in part on a plurality of thresholds for each industry sector defined by the determined portfolio objective.

9. The system of claim 6 wherein the processor is further configured to receive input that defines a plurality of investment parameters for the determined portfolio objective, the parameters including an identification of a total investment amount for the portfolio.

10. The system of claim 9 wherein the processor is further configured to (1) determine an investment amount for each of a plurality of financial instrument classifications based at least in part on the determined portfolio objective and the total investment amount and (2) provide a GUI for display that is configured to (i) display the determined investment amounts for the plurality of financial instrument classifications, (ii) receive input corresponding to a modification of the determined investment amounts for the financial instrument classifications, and (iii) determine the investment amounts for individual financial instrument products for recommendation based thereon.

11. The system of claim 2 wherein the processor comprises a server in communication with the memory and a plurality of user computers, the server configured to provide the GUIs to the user computers for display thereon to permit users of the user computers to generate portfolios for a plurality of investors.

12. The system of claim 1 wherein each of the financial instrument product data structures comprises data that defines a suitability category associated with its corresponding financial instrument product, wherein the memory is further configured to store a plurality of portfolio objective data structures, each portfolio objective data structure corresponding to a portfolio objective such that the plurality of portfolio objective data structures correspond in the aggregate with a plurality of portfolio objectives, each portfolio objective data structure comprising (1) data that defines a target allocation for at least one financial instrument classification, and (2) data that defines a target allocation for at least one suitability category, wherein the financial instrument product data structures and the portfolio objective data structures are associated with each other through common suitability categories and financial instrument classifications.

13. The system of claim 12 wherein the processor is further configured to identify a set of financial instrument products that are eligible for inclusion in the portfolio by (1) identifying the at least one financial instrument classification and the at least one suitability category defined by the portfolio objective data structure which corresponds to the determined portfolio objective, (2) identifying a financial instrument product that is (i) associated with a suitability category corresponding to the same at least one suitability category identified from the portfolio objective data structure which corresponds to the determined portfolio objective, and (ii) associated with a financial instrument classification corresponding to the same at least one financial instrument classification identified from the portfolio objective data structure which corresponds to the determined portfolio objective, and (3) including the identified financial instrument product in the set.

14. The system of claim 13 wherein the processor is further configured to cull the set to determine the financial instrument products for recommendation for inclusion in the portfolio by selecting individual financial instrument products from the set in accordance with the target allocations from the portfolio objective data structure which corresponds to the determined portfolio objective.

15. A system for building a recommended investment portfolio, the system comprising:
a memory configured to store a plurality of data structures, each data structure corresponding to a financial instrument product and being associated with at least one of a plurality of financial instrument classifications and with at least one of a plurality of portfolio objectives, wherein the memory is configured to store data structures for financial instrument products associated with a plurality of different financial instrument classifications and a plurality of different portfolio objectives;
a server in communication with the memory, the server further in communication with at least one user computer over a network, the server configured to (1) receive an input from the at least one user computer corresponding to a portfolio objective for an investor, (2) provide a first graphical user interface (GUI) to the at least one user computer for display thereon, the first GUI configured to receive input from the user that comprises (i) a total investment amount for the portfolio, and (ii) a plurality of parameters for the portfolio with respect to investments in a plurality of different financial instrument classifications, (3) determine a recommended investment amount for each of a plurality of the different financial instrument classifications based on the received investment portfolio objective input, the received total investment amount input and the received parameter input, (4) provide a second GUI to the at least one user computer for display thereon, the second GUI configured to display the determined recommended investment amounts for the different financial instrument classifications and permit the user to modify at least one of those recommended investment amounts, (5) determine a plurality of individual financial instrument products for inclusion in the recommended portfolio and an investment amount for each of those individual financial instrument products based on (i) the received portfolio objective input applied to data structures to identify individual financial instrument products that are associated with the received portfolio objective input, (ii) the received total investment amount input, (iii) the received parameter input, and (iv) any received modification input via the second GUI, (6) provide a third GUI to the at least one user computer for display thereon, the third GUI configured to (i) display each of the determined individual financial instrument products corresponding to a first financial instrument classification together with its determined investment amount, and (ii) permit the user to modify at least one recommended investment amount therefor, (7) provide a fourth GUI to the at least one user computer for display thereon, the fourth GUI configured to (i) display each of the determined individual financial instrument products corresponding to a second financial instrument classification together with its determined investment amount, and (ii) permit the user to modify at least one recommended investment amount therefor, and (8) provide a fifth GUI to the at least one user computer for display thereon, the fifth GUI configured to (i) display each of the determined individual financial instrument products corresponding to a third financial instrument classification together with its determined investment amount, and (ii) permit the user to modify at least one recommended investment amount therefor.

16. The system of claim 15 wherein the first, second and third financial instrument classifications comprise stocks, bonds and mutual funds.

17. The system of claim 16 wherein the server is further configured to provide a notice to the at least one user computer in response to any modification input for the portfolio that causes the portfolio to fall outside of a boundary threshold for the portfolio's portfolio objective.

18. The system of claim 16 wherein the portfolio objective corresponds to a plurality of investment rules for a plurality of stocks with respect to a plurality of industry sectors such that the portfolio objective defines a target investment threshold for each of a plurality of industry sectors, and wherein the server is configured to select stocks for inclusion in the portfolio based on (1) which industry sector each stock belongs to and (2) the target investment thresholds.

19. The system of claim 18 wherein the GUI corresponding to stocks is further configured to display stock recommendations for each of the plurality of industry sectors.

* * * * *